US010661149B2

(12) United States Patent
Kudirka et al.

(10) Patent No.: US 10,661,149 B2
(45) Date of Patent: May 26, 2020

(54) MIXED-REALITY SPORTS TRACKING AND SIMULATION

(71) Applicant: vSports, LLC, Omaha, NE (US)

(72) Inventors: Thomas Kudirka, Omaha, NE (US); Patrick J. Bennett, Omaha, NE (US)

(73) Assignee: vSports, LLC, Omaha, NE (US)

( * ) Notice: Subject to any disclaimer, the term of this patent is extended or adjusted under 35 U.S.C. 154(b) by 0 days.

(21) Appl. No.: 16/002,860

(22) Filed: Jun. 7, 2018

(65) Prior Publication Data

US 2019/0134487 A1 May 9, 2019

Related U.S. Application Data

(63) Continuation-in-part of application No. 15/991,867, filed on May 29, 2018, now Pat. No. 10,525,324, (Continued)

(51) Int. Cl.
*A63B 71/06* (2006.01)
*G06F 3/147* (2006.01)
(Continued)

(52) U.S. Cl.
CPC ...... *A63B 71/0622* (2013.01); *A63B 24/0021* (2013.01); *A63B 69/00* (2013.01);
(Continued)

(58) Field of Classification Search
CPC ............ A63B 71/0622; A63B 71/0021; A63B 69/0079; A63B 69/385; A63B 69/0002;
(Continued)

(56) References Cited

U.S. PATENT DOCUMENTS 9,694,269 B2 7/2017 Leech et al.
9,802,102 B2 10/2017 Leech
(Continued)

FOREIGN PATENT DOCUMENTS

EP 3200008 A1 8/2017

OTHER PUBLICATIONS

"Seriously Anything: Future", Youtube video clip accessible as of Mar. 7, 2017 at https://youtu.be/5rW0P3wbS4o, Ally Invest Securities LLC, apparently published on Sep. 11, 2017.
(Continued)

*Primary Examiner* — Xilin Guo
(74) *Attorney, Agent, or Firm* — Suiter Swantz pc llo

(57) ABSTRACT

A mixed-reality sport simulation system includes a projectile-tracking sub-system to generate projectile-tracking data when a projectile is launched by a user, a near-eye display to display mixed-reality virtual objects displayed over physical objects within a field of view of a user representing lines of sight of the user, and a controller. The controller may direct the near-eye display to display a mixed-reality environment including virtual objects within the field of view. The near-eye display may provide an unobstructed real-world view for view vectors below a selected pitch angle and at least a portion of the mixed-reality environment for view vectors above a selected pitch angle. The controller may receive projectile-tracking data in real-time from the projectile-tracking sub-system and may direct the near-eye display to display one or more virtual objects representing a trajectory of the projectile within the mixed-reality environment in real-time based on the projectile-tracking data.

18 Claims, 28 Drawing Sheets

Related U.S. Application Data which is a continuation-in-part of application No. 15/914,789, filed on Mar. 7, 2018, now Pat. No. 10,204,456, and a continuation-in-part of application No. 15/914,812, filed on Mar. 7, 2018.

(60) Provisional application No. 62/590,556, filed on Nov. 25, 2017, provisional application No. 62/577,551, filed on Oct. 26, 2017, provisional application No. 62/520,127, filed on Jun. 15, 2017, provisional application No. 62/516,155, filed on Jun. 7, 2017, provisional application No. 62/511,657, filed on May 26, 2017, provisional application No. 62/468,044, filed on Mar. 7, 2017.

(51) Int. Cl.

| | | |
|---|---|---|
| *A63B 69/00* | (2006.01) | |
| *A63B 71/02* | (2006.01) | |
| *A63B 24/00* | (2006.01) | |
| *G06F 3/01* | (2006.01) | |
| *A63F 13/26* | (2014.01) | |
| *A63F 13/211* | (2014.01) | |
| *A63F 13/213* | (2014.01) | |
| *A63F 13/00* | (2014.01) | |
| *A63F 13/812* | (2014.01) | |
| *G06F 3/0354* | (2013.01) | |
| *A63F 13/65* | (2014.01) | |
| *A63B 69/38* | (2006.01) | |

(52) U.S. Cl.
CPC ........ *A63B 69/0079* (2013.01); *A63B 71/022* (2013.01); *A63F 13/00* (2013.01); *A63F 13/211* (2014.09); *A63F 13/213* (2014.09); *A63F 13/26* (2014.09); *A63F 13/65* (2014.09); *A63F 13/812* (2014.09); *G06F 3/011* (2013.01); *G06F 3/013* (2013.01); *G06F 3/03548* (2013.01); *G06F 3/147* (2013.01); *A63B 69/0002* (2013.01); *A63B 69/0015* (2013.01); *A63B 69/0026* (2013.01); *A63B 69/385* (2013.01); *A63B 2024/0031* (2013.01); *A63B 2024/0068* (2013.01); *A63B 2024/0096* (2013.01); *A63B 2069/0006* (2013.01); *A63B 2069/0008* (2013.01); *A63B 2071/0636* (2013.01); *A63B 2071/0647* (2013.01); *A63B 2071/0666* (2013.01); *A63B 2220/803* (2013.01); *A63B 2220/806* (2013.01); *A63B 2220/833* (2013.01); *A63B 2220/836* (2013.01); *A63B 2220/89* (2013.01); *A63B 2225/50* (2013.01)

(58) Field of Classification Search
CPC ............ A63B 69/0015; A63B 69/0006; A63B 2069/0008; A63B 2071/0636; A63B 2071/0647; A63B 2071/0666; A63B 2225/50; A63B 2220/836; A63B 2220/833; A63B 2024/0031; A63B 2024/0068; A63B 2024/0096; A63B 2220/806; A63B 2220/803; A63B 71/06; A63B 2071/0638; A63B 2102/32; G06F 3/013; G06F 3/147; G06F 3/03548; G06F 3/011; G06F 3/01; G06F 16/29; G06F 3/0482; G06F 3/04842; A63F 13/00; A63F 13/812; A63F 13/26; A63F 13/211; A63F 13/65; A63F 13/213; G06T 2207/30261; G06T 19/006; G06T 2207/30241

See application file for complete search history.

(56) References Cited

U.S. PATENT DOCUMENTS

| | | |
|---|---|---|
| 9,839,828 B2 | 12/2017 | Leech et al. |
| 9,914,037 B2 | 3/2018 | Nordstrom |
| 10,204,456 B2 | 2/2019 | Kudirka et al. |
| 2006/0116185 A1 | 6/2006 | Krull |
| 2006/0287137 A1 | 12/2006 | Chu |
| 2007/0238539 A1 | 10/2007 | Dawe et al. |
| 2007/0298896 A1 | 12/2007 | Nusbaum et al. |
| 2009/0213038 A1 | 8/2009 | Huang et al. |
| 2011/0224027 A1 | 9/2011 | Edmondson |
| 2012/0007885 A1 | 1/2012 | Huston |
| 2012/0236031 A1 | 9/2012 | Haddick et al. |
| 2013/0095924 A1 | 4/2013 | Geisner et al. |
| 2013/0117377 A1 | 5/2013 | Miller |
| 2013/0137076 A1 | 5/2013 | Perez et al. |
| 2013/0172093 A1 | 7/2013 | Leech |
| 2013/0328762 A1 | 12/2013 | McCulloch et al. |
| 2014/0038750 A1 | 2/2014 | Leech |
| 2014/0287806 A1 | 9/2014 | Balachandreswaran |
| 2015/0050629 A1 | 2/2015 | Pease et al. |
| 2015/0343294 A1* | 12/2015 | Leech ................ A63B 69/3608 473/209 |
| 2015/0373474 A1 | 12/2015 | Kraft et al. |
| 2015/0379351 A1* | 12/2015 | Dibenedetto ...... G06K 9/00671 345/633 |
| 2016/0158640 A1 | 6/2016 | Gupta et al. |
| 2016/0169635 A1* | 6/2016 | Hannigan ............... F41A 33/00 235/411 |
| 2016/0377864 A1 | 12/2016 | Moran et al. |
| 2017/0028299 A1 | 2/2017 | The et al. |
| 2017/0142329 A1* | 5/2017 | Pelz ................... H04N 5/23219 |
| 2017/0151484 A1 | 6/2017 | Reilly et al. |
| 2017/0203187 A1 | 7/2017 | Ito et al. |
| 2017/0263056 A1 | 9/2017 | Leppanen et al. |
| 2017/0272703 A1* | 9/2017 | Allen ................. G06Q 10/0639 |
| 2017/0340948 A1 | 11/2017 | Leech |
| 2018/0053284 A1 | 2/2018 | Rodriguez et al. |
| 2018/0065018 A1 | 3/2018 | Leech et al. |
| 2018/0065019 A1* | 3/2018 | Shibuya ............. A63B 69/3632 |
| 2018/0256962 A1 | 9/2018 | Kudirka et al. |
| 2018/0261010 A1 | 9/2018 | Kudirka et al. |

OTHER PUBLICATIONS

International Search Report and Written Opinion dated May 7, 2018 for PCT/US2018/021323.

International Search Report and Written Opinion dated May 14, 2018 for PCT/US2018/021317.

International Search Report and Written Opinion dated Aug. 29, 2018 for PCT/US2018/034949.

International Search Report and Written Opinion dated Sep. 10, 2018 for PCT/US2018/036544.

\* cited by examiner

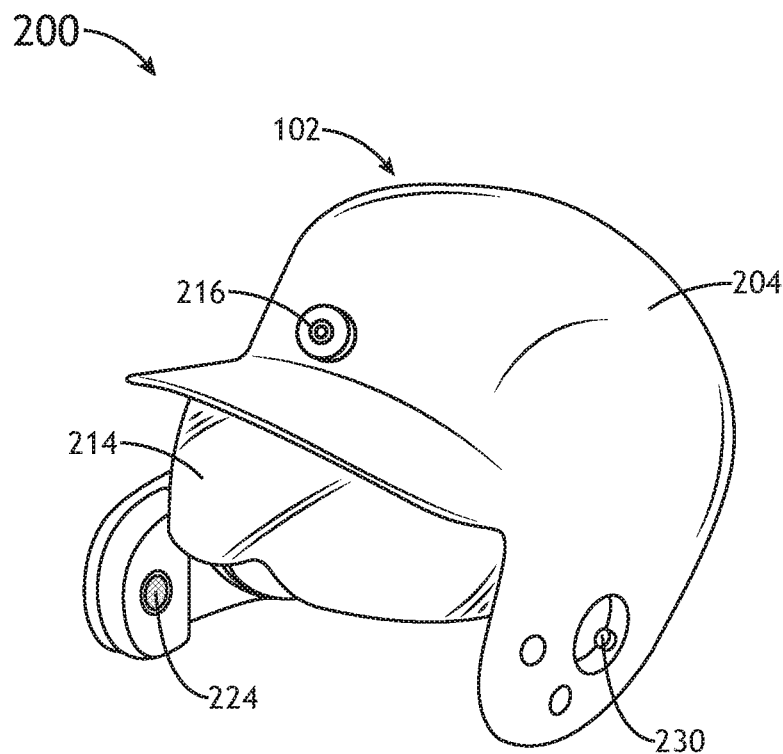
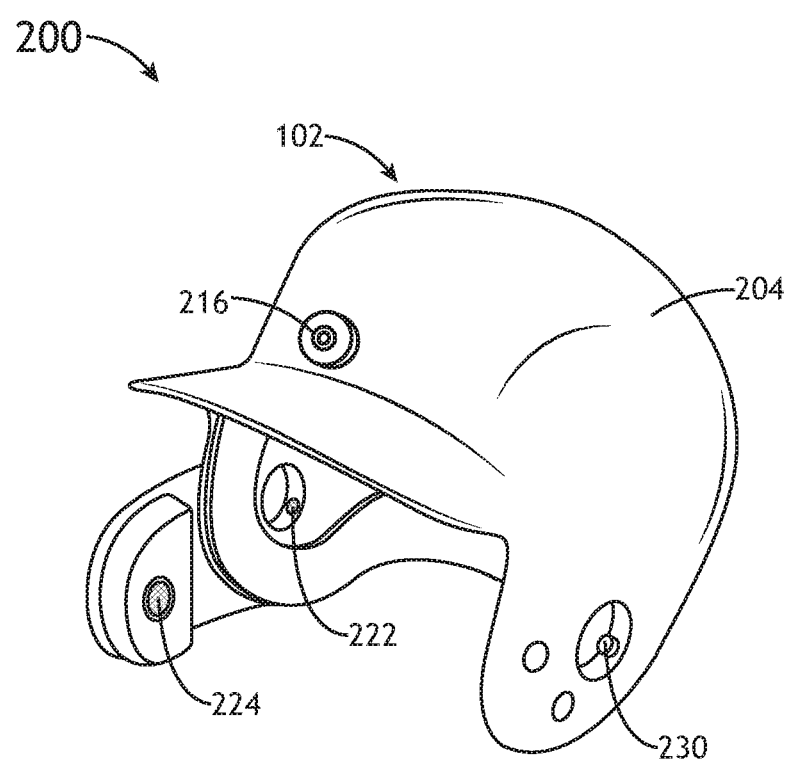
FIG.2C

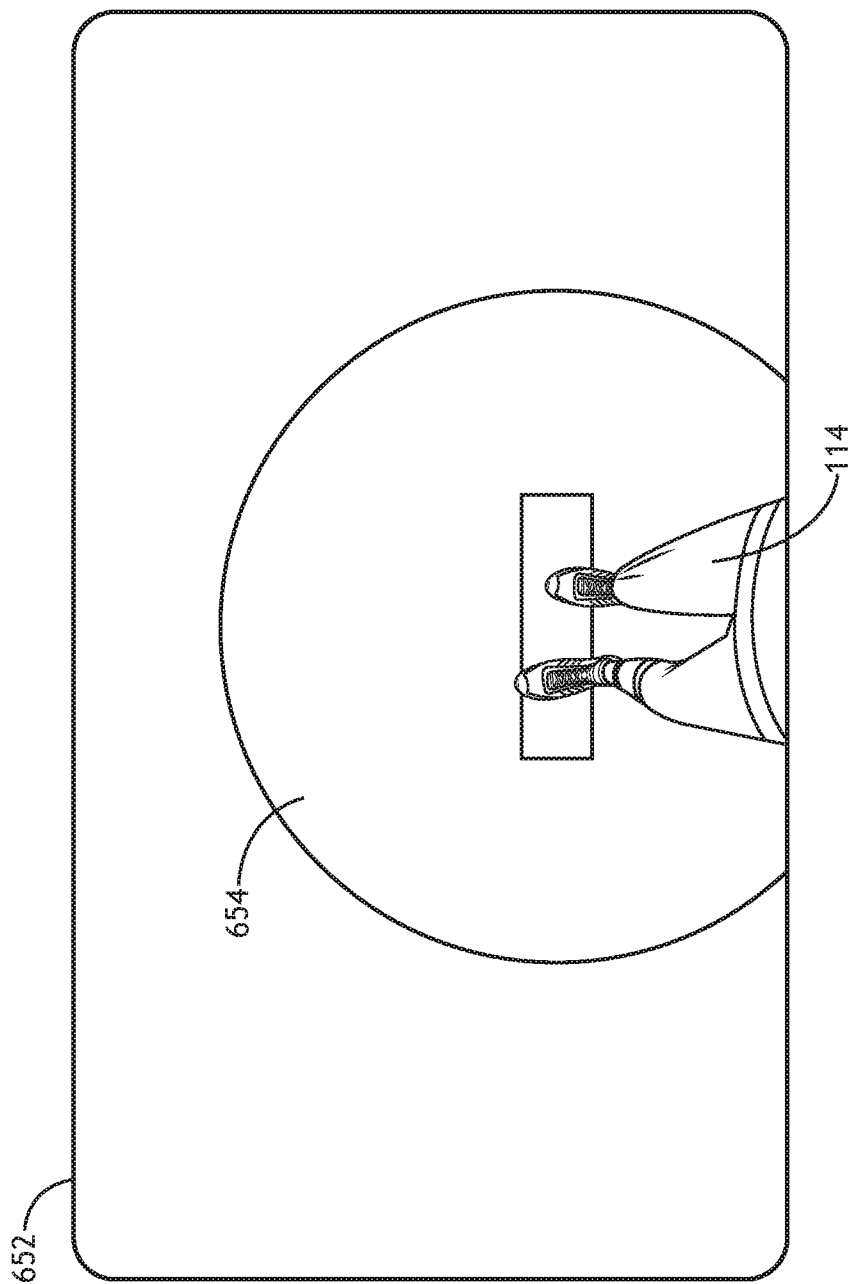

MIXED-REALITY SPORTS TRACKING AND SIMULATION

CROSS-REFERENCE TO RELATED APPLICATION

The present application is a continuation-in-part of U.S. application Ser. No. 15/991,867, filed May 29, 2018, entitled Mixed-Reality Kick Tracking and Simulation, which claims priority to U.S. application Ser. No. 15/914,789, filed Mar. 7, 2018, entitled Mixed Reality Golf Simulation and Training System, which claims priority to U.S. Provisional Application Ser. No. 62/468,044 filed Mar. 7, 2017 and U.S Provisional Application Ser. No. 62/577,551 filed Oct. 26, 2017. U.S. application Ser. No. 15/991,867 also claims priority to U.S. application Ser. No. 15/914,812, filed Mar. 7, 2018, entitled Mixed Reality Sport Simulation and Training System, which claims priority to U.S. Provisional Application Ser. No. 62/511,657 filed May 26, 2017, U.S. Provisional Application No. 62/516,155 filed Jun. 7, 2017, U.S. Provisional Application No. 62/520,127 filed Jun. 15, 2017, and U.S Provisional Application Ser. No. 62/590,556 filed Nov. 25, 2017. U.S. application Ser. No. 15/991,867 also claims priority to U.S. Provisional Application Ser. No. 62/511,657, filed May 26, 2017; U.S. Provisional Application Ser. No. 62/590,556, filed Nov. 25, 2017; U.S. Provisional Application Ser. No. 62/520,127, filed Jun. 15, 2017; and U.S. Provisional Application Ser. No. 62/577,551, filed Oct. 26, 2017.

The present application claims also claims priority to U.S. Provisional Application Ser. No. 62/516,155, filed Jun. 7, 2017, entitled Augmented Reality Baseball Simulation and Training System; U.S. Provisional Application Ser. No. 62/520,127, filed Jun. 15, 2017, entitled Augmented Reality Soccer Simulation and Training System; and U.S. Provisional Application Ser. No. 62/590,556, filed Nov. 25, 2017, entitled Augmented Reality Football Kick Simulator.

All of the above-listed applications are incorporated herein by reference in their entirety.

TECHNICAL FIELD

The present disclosure relates generally to sports simulation and, more particularly, to a mixed-reality sports simulation and training system.

BACKGROUND

Many athletic sports require a player to control the trajectory of a projectile (e.g., a ball, a puck, a javelin, a discus, a shotput, a hammer, or the like) during play, either by launching the projectile themselves or by hitting and/or returning the projectile launched by another player. Further, an athlete may typically perform any of multiple actions involving different desired trajectories based on strategy. For example, an athlete may train to perform multiple throwing or delivery techniques or may train to launch the projectile using a piece of equipment (e.g., a stick, a bat, a racquet, or the like) using multiple techniques to achieve a desired result. For instance, a baseball pitcher may train to perform multiple pitches, a cricket bowler may train to perform multiple deliveries, a hockey player may train to perform multiple shot types with a stick, a tennis, squash, or racquetball player play may train to perform multiple serves with a racquet. By way of another example, an athlete may train to hit an incoming ball (e.g., with a bat, a racquet, or the like) in different ways to achieve a desired result.

Regardless of the sport, each type of motion typically requires a different technique to achieve a desired trajectory (e.g., speed, distance, and/or rotation). Small changes in an athlete's technique may affect factors such as the launch angle, initial velocity, or rotation that may significantly impact the trajectory of the ball and thus whether an action (e.g., a throw, delivery, hit, shot, or the like) is deemed successful. Athletes thus often train on a field to view the motion of the projectile as feedback and attempt to adjust their techniques.

However, field practice is not always practical and may be insufficient to diagnose issues with launching or hitting techniques. For example, field practice may be limited by weather or access to facilities. By way of another example, athletes warming up for a game may be limited to sideline practice into nets that do not provide feedback to evaluate whether the actions would be successful on the field. For instance, practice swings of a bat may help an athlete mentally prepare for a pitch, but they may not provide meaningful feedback. Further, simply viewing a trajectory of a projectile in the real world during field practice does not provide detailed trajectory information and thus may provide only limited feedback for correcting or modifying technique. For example, merely observing an issue (e.g., lack of control of a throw, a hit, a shot, or the like) may be insufficient to solve the problem. Therefore, it may be desirable to provide systems and methods to cure the deficiencies identified above.

SUMMARY

A mixed-reality sport simulation system is disclosed in accordance with one or more illustrative embodiments of the present disclosure. In one illustrative embodiment, the system includes a projectile-tracking sub-system configured to generate projectile-tracking data when a projectile is launched by a user. In another illustrative embodiment, the system includes a near-eye display configured to display mixed-reality virtual objects displayed over physical objects within a field of view of a user. In another illustrative embodiment, the near-eye display includes one or more sensors to determine the field of view. In another illustrative embodiment, the field of view defines view vectors representing lines of sight of the user. In another illustrative embodiment, the system includes a controller communicatively coupled to the projectile-tracking sub-system and the near-eye display. In another illustrative embodiment, the controller directs the near-eye display to display a mixed-reality environment including virtual objects within at least a portion of the user field of view in which the near-eye display provides an unobstructed real-world view for view vectors below a selected pitch angle and display at least a portion of the mixed-reality environment for view vectors above a selected pitch angle. In another illustrative embodiment, the controller receives projectile-tracking data of a projectile launched by the user in real-time from the projectile-tracking sub-system. In another illustrative embodiment, the controller directs the near-eye display to display one or more virtual objects representing a trajectory of the projectile within the mixed-reality environment in real-time where the trajectory of the projectile is based on the projectile-tracking data.

A mixed-reality sport simulation system is disclosed in accordance with one or more illustrative embodiments of the present disclosure. In one illustrative embodiment, the system includes a projectile-tracking sub-system configured to generate projectile-tracking data over a selected portion of a trajectory of a projectile launched by a user. In another illustrative embodiment, the system includes a near-eye display configured to display a mixed-reality scene including virtual objects displayed over physical objects within a field of view of the user. In another illustrative embodiment, the system includes a controller communicatively coupled to the projectile-tracking sub-system and the near-eye display. In another illustrative embodiment, the controller directs the near-eye display to provide an unobstructed real-world view of the projectile prior to the user launching the projectile. In another illustrative embodiment, the controller receives projectile-tracking data of a projectile over the launch window in real-time from the projectile-tracking sub-system over the selected portion of the trajectory of the projectile launched by the user. In another illustrative embodiment, the controller directs the near-eye display to display a selected portion of the projectile-tracking data as one or more virtual objects in real time after the launch.

A mixed-reality sport simulation system is disclosed in accordance with one or more illustrative embodiments of the present disclosure. In one illustrative embodiment, the system includes a projectile-tracking sub-system configured to generate projectile-tracking data of a projectile over a launch window when the projectile is launched by a user where a trajectory of the projectile is limited by a containment device. In another illustrative embodiment, the system includes a near-eye display configured to display mixed-reality virtual objects displayed over physical objects within a field of view of the user, wherein the near-eye display includes a user input device. In another illustrative embodiment, the system includes a controller communicatively coupled to the projectile-tracking sub-system and the near-eye display. In another illustrative embodiment, the controller directs the near-eye display to display a mixed-reality environment including virtual objects depicting one or more elements of an athletic field within at least a portion of the user field of view, where a location of the user within the mixed-reality environment is selectable via the user input device. In another illustrative embodiment, the controller receives projectile-tracking data of a projectile over the launch window in real-time from the projectile-tracking sub-system as the user launches the projectile. In another illustrative embodiment, the controller directs the near-eye display to display a virtual object representing the projectile moving along a predicted trajectory after the launch window within the mixed-reality environment where the predicted trajectory is determined based on the projectile-tracking data over the launch window.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which:

FIG. 2C includes a perspective view and an exploded view of a mixed-reality helmet including a near-eye display, in accordance with one or more embodiments of the present disclosure.

FIG. 3I is an exploded view of projectile-tracking sensors integrated within the center of a tennis ball projectile, in accordance with one or more embodiments of the present disclosure.

FIG. 6E is a conceptual view of a field of view of an unobstructed view of a pitcher of FIG. 6A when looking in a downward direction, in accordance with one or more embodiments of the present disclosure.

FIG. 6I is a conceptual view of the mixed-reality environment illustrated in FIGS. 6B from a field of view of a batter with an unobstructed view of a projectile source, in accordance with one or more embodiments of the present disclosure.

DETAILED DESCRIPTION

Figure 1A:
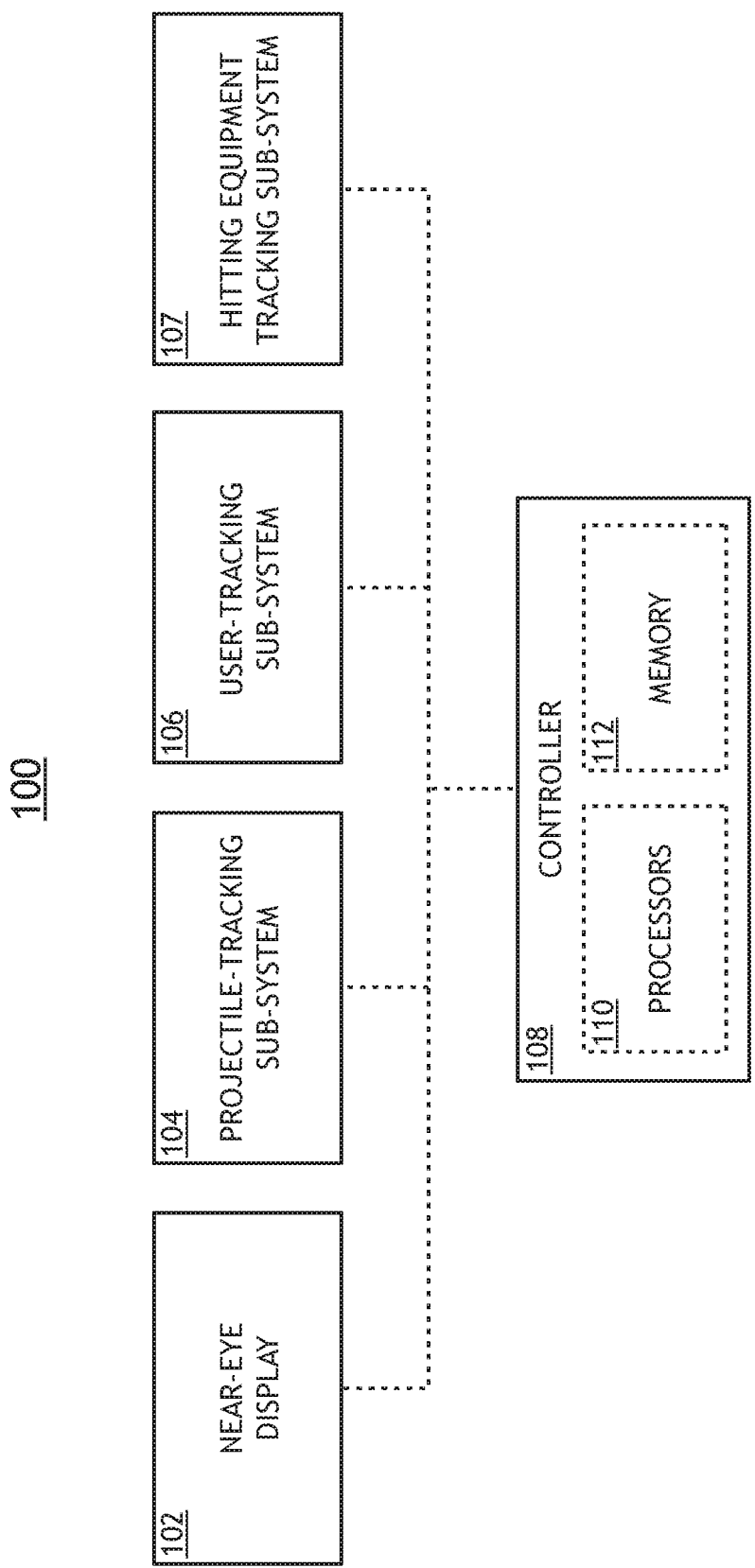
FIG. 1A is a block diagram of components of a mixed-reality projectile-tracking simulator, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to a mixed-reality sports projectile-tracking simulation and training system (e.g., a mixed-reality projectile-tracking simulator). For example, a mixed-reality projectile-tracking simulator may include a mixed-reality display device coupled to a projectile-tracking system including one or more sensors internal to or external to a projectile suitable for tracking the projectile during and after a desired action (e.g., a throw, a delivery, a shot, a hit, or the like). Further, the mixed-reality projectile-tracking simulator may include a user-tracking system including one or more sensors suitable for monitoring the motion of the user during the action.

The mixed-reality projectile-tracking simulator may be suitable for use with any style of projectile associated with any sport such as, but not limited to baseball, cricket, tennis, racquetball, squash, hockey, javelin, discus, hammer, or shotput. In some embodiments, a user may throw or hit a projectile and immediately view relevant data about the mechanics of the action as well as the resulting trajectory. For example, a mixed-reality projectile-tracking simulator may provide relevant data obtained from the projectile-tracking system such as, but not limited to, launch velocity (e.g., launch speed), launch angle, travel distance, hang time, rotation, or location of impact. In some embodiments, a user may throw or hit a projectile into a net or other containment device and view a virtual projectile moving along a predicted trajectory within a virtual scene such as a field or a stadium overlaid on the real-world view of the user based on tracking data over a partial trajectory. Accordingly, the user may receive immediate visual and data-driven feedback without requiring the user to be physically present at the field.

For the purposes of the present disclosure, the term "throw" is used to indicate an action in which a user uses his or her body to launch a projectile, and the term "hit" is used to indicate an action in which a user uses a piece of athletic equipment (e.g., a stick, a bat, a racquet, or the like) to launch a projectile regardless of whether the athlete initiates the projectile motion (e.g., a pitch in baseball, a serve in tennis, or the like) or the athlete responds to a projectile from another player (e.g., batting in baseball, performing a shot in tennis or hockey, or the like). It is recognized herein that certain sports may have distinct technical terminology related to the relevant projectiles or to distinguish certain types of actions. However, the terms "throw" and "hit" are used herein for the purposes of clarity to broadly describe actions of multiple sports.

Additional embodiments of the present disclosure are directed to a near-eye display with a wearable form-factor. For example, a mixed-reality display device may include mixed-reality glasses providing a partially transmissive surface through which a real-world view of physical objects such as the ball may be viewed as well as an interface for displaying virtual objects to the user. By way of another example, a mixed-reality display device may include a mixed-reality helmet. For instance, components associated with a mixed-reality display device may be integrated within a helmet traditionally worn for a particular sport such as, but not limited to, a baseball helmet or a hockey helmet. The mixed-reality projectile-tracking simulator may thus be portable and may be suitable for use at a location convenient to the user.

The term "mixed-reality" in the present disclosure refers to a visualization technique in which virtual objects are displayed over at least a portion of a field of view of a user. Mixed-reality may encompass a broad range of technologies in which the relative predominance of virtual objects versus physical objects (e.g., objects seen directly with a user's eyes) varies across a spectrum. On one end of the mixed-reality spectrum, commonly referred to as augmented reality (AR), virtual objects are displayed over or are otherwise integrated along with a real-world view of user. In this regard, a field of view may be primarily filled with physical objects seen directly by the user, and virtual objects may be integrated with or interact with the physical objects. On an opposite end of the mixed-reality spectrum, commonly referred to as virtual reality (VR), a field of view is completely obstructed by a virtual scene such that a user is immersed within the virtual scene. Various mixed-reality technologies may further blend virtual and physical objects in a wide range of techniques and user experiences.

Virtual objects may have any degree of transparency to a user. For example, a virtual object may be partially transparent such that physical objects may be partially visible through the virtual object. Accordingly, partially transparent virtual objects may be, but are not required to be, used as guides. By way of another example, a virtual object may be opaque and obstruct a portion of a field of view. In this regard, opaque virtual objects may replace physical objects within a portion of a field of view with virtual objects and may be, but are not required to be, used to provide an immersive scene to a user.

Additional embodiments of the present disclosure are directed to a mixed-reality projectile-tracking simulator with user-selectable display settings to configure a mixed-reality environment for display before or after a user action (e.g., a throw or a hit). For example, a user in an open field such as a grass field, a parking lot, or an unmarked ice rink may selectively display virtual objects depicting turf, field markings or goals of a selected sport. For instance, a user may selectively display foul lines, foul posts, bases, a pitching mound, dirt, or turf of a baseball diamond. In another instance, a user may selectively display a net, sidelines (singles or doubles), or service lines of a tennis court. In another instance, a user may selectively display a center line, boards, goal lines, faceoff circles, or goals of a hockey rink. In this regard, the virtual objects may be, but are not required to be, characterized as AR objects that coexist with physical objects such as the field within the real-world view of the user. Further, the mixed-reality projectile-tracking simulator may continuously adjust the sizes and orientations of the virtual objects based on the head orientation and/or lines of sight associated with a field of view of the user to maintain integration with the surrounding physical objects. By way of another example, a user may selectively display an opaque virtual scene representing a field or a stadium. In this regard, the virtual objects may be, but are not required to be, characterized as virtual-reality (VR) objects. Accordingly, the mixed-reality projectile-tracking simulator may provide an immersive audio/visual experience.

Additional embodiments of the present disclosure are directed to a mixed-reality projectile-tracking simulator with user-selectable data to be displayed on the mixed-reality display. For example, a projectile-tracking system may include cameras and/or sensors to track various aspects of a projectile such as, but not limited to, position, velocity, acceleration, direction, launch angle, or rotation for a selected period of time (e.g., a launch window). The mixed-reality projectile-tracking simulator may then display raw or processed data from the projectile-tracking system to the user as virtual objects. The user may then, for example, utilize the data to analyze and make adjustments to technique. In one instance, a user on an athletic field may perform one or more actions (e.g., throws or hits) and the mixed-reality projectile-tracking simulator may provide relevant data associated with the actions to the user as virtual objects.

Additional embodiments of the present disclosure are directed to tracking the trajectory of a projectile over a limited period of time (e.g., a launch window) and displaying a predicted trajectory of the projectile after the launch window. By way of another example, the mixed-reality projectile-tracking simulator may display a virtual projectile travelling across a predicted trajectory determined based on data from the projectile-tracking system. In this regard, a user may throw or hit a projectile in a constrained environment such as a net or a tether and view simulated motion of the projectile in a mixed-reality environment through a complete (predicted) trajectory. Further, the mixed-reality projectile-tracking simulator may optionally display all or part of the predicted trajectory of the projectile by a persistent arc (e.g., a comet tail, or the like).

Additional embodiments of the present disclosure are directed to a mixed-reality projectile-tracking simulator with a user-tracking system. For example, a user-tracking system may include one or more sensors worn by the user, attached and/or integrated into sport equipment (e.g., a bat, a racquet, a stick, or the like), or external to a user to track aspects of a user's motion prior to and during an action such as, but not limited to, foot placement, arm position, shoulder position, head angle, knee angle, or an arm speed.

Additional embodiments of the present disclosure are directed to a mixed-reality projectile-tracking simulator with a hitting equipment tracking system. For example, the hitting equipment tracking system may include one or more sensors to track the trajectory of hitting equipment (e.g., a bat, a racquet, a stick, or the like) such as, but not limited to, equipment speed (e.g., bat speed, racquet speed, stick speed, or the like), equipment trajectory, or point of impact of a projectile during a hit. The user-tracking data may thus be integrated with the projectile-tracking data from the projectile-tracking system to provide additional feedback to the user.

Additional embodiments of the present disclosure are directed to displaying a mixed-reality environment within a selected range of line of sight directions (e.g., view directions, view vectors, gaze directions, gaze vectors, or the like). It is recognized herein that it may be desirable for an athlete to have an unobstructed real-world view at selected times or viewing angles. For example, in the case of a throwing action to another person (e.g., a catcher, or the like), it may be desirable to provide an unobstructed real-world view of the target person for safety. In another instance, in the case of a hitting action, it may be desirable to provide an unobstructed real-world view of the source of the projectile (e.g., a pitcher). Accordingly, a mixed-reality projectile-tracking simulator may provide an unobstructed real-world view of selected physical objects (e.g., the target and/or the source of the projectile) regardless of the viewing angle. In some embodiments, the mixed-reality projectile-tracking simulator may reserve a selected set of lines of sight associated with the selected physical objects for unobstructed real-world views (e.g., a cone of reality) such that the physical objects remain unobstructed as the user moves his or her head.

By way of another example, virtual objects displayed by the mixed-reality projectile-tracking simulator may be bounded to a selected range of view directions. In this regard, a user may view virtual objects (e.g., tracking data, a trajectory (real or predicted) virtual elements of a mixed-reality scene, or the like) when looking in selected directions and may view an unobstructed real-world view when looking in other directions. In one instance, the mixed-reality projectile-tracking simulator may provide a transparent or unobstructed view to the projectile when a user's head is facing downwards or towards the projectile and may then transition into a mixed-reality scene as the user looks forward. Accordingly, a user may iteratively look up in a direction of an action to view virtual objects (e.g., a virtual goal displayed on a physical field, an immersive virtual reality view of a stadium, or the like) and may look down to see an unobstructed real-world view (e.g., of a user's feet, or the like) to line up a shot and prepare for an action. Similarly, trajectory and/or projectile-tracking data may be displayed in real-time after an action.

Additional embodiments of the present disclosure are directed to displaying a mixed-reality environment only at selected times (e.g., during or after an action). For example, the mixed-reality projectile-tracking simulator may provide an unobstructed real-world view prior to an action (e.g., to allow the user to set up and prepare for the action) and may display one or more virtual objects after the action. In this regard, a user may execute an action with minimal distractions in a natural environment, but may view any selected virtual objects after the action to provide a mixed-reality simulation experience. In one instance, a user on a training field may execute launches (e.g., sporting actions) with an unobstructed real-world view and may view virtual objects such as, but not limited to, a trajectory of the projectile and/or selected trajectory data (e.g., from the projectile-tracking system and/or the user-tracking system) in real-time after the action.

Additional embodiments of the present disclosure are directed to a mixed-reality projectile-tracking simulator including guided user coaching using any combination of audio and mixed-reality visualizations. For example, a mixed-reality projectile-tracking simulator may provide coaching suggestions to a user on various techniques, suggest body positions, or the like. For instance, a mixed-reality projectile-tracking simulator may provide guides for the user such as, but not limited to, guides for suggested body positions, body movements, or projectile trajectories. In this regard, the user may be provided suggested techniques for accomplishing certain actions (e.g., pitching into a selected portion of a strike zone, or the like). Further, the coaching suggestions may be pre-recorded and/or may be data driven. For instance, the coaching suggestions may be based on data from the projectile-tracking system and/or the user-tracking system for a single action or based on an analysis of historical data. It is recognized herein that while certain fundamental aspects of a sports technique (e.g., throwing technique, pitching technique, batting technique, serving technique, or the like) may be relevant to all or most users, it may be the case that certain technical aspects may vary between users such that coaching suggestions may be personalized. Accordingly, a mixed-reality projectile-tracking simulator may generate correlations between aspects of user motion and corresponding trajectories over time based on historical data tracked and stored by the system to develop customized feedback for individual users.

Additional embodiments of the present disclosure are directed to providing mixed-reality feedback to the user. For example, a mixed-reality projectile-tracking simulator may utilize data from the user-tracking system and/or the projectile-tracking system to capture and subsequently replay user and projectile motion. In one instance, the mixed-reality projectile-tracking simulator may display a 3D avatar of the user performing selected actions in mixed-reality. Accordingly, a user may save and later view a saved action in a 3D mixed-reality environment such that the user may walk around the avatar and view the motion of the user's body and/or the motion of the projectile from a variety of angles. It is recognized herein that viewing saved actions in a 3D mixed-reality environment may provide useful feedback to the user. For example, a user may save and review successful attempts to determine what techniques work well and what techniques do not.

Additional embodiments of the present disclosure are directed to a mixed-reality projectile-tracking simulator providing multi-person support. Multiple users with mixed-reality projectile-tracking simulators may thus interact with each other in virtual environments. Further, the multiple users may be located close to each other (e.g., on the same physical field) or may be located remotely. For example, the multiple mixed-reality projectile-tracking simulators may provide a common virtual environment that is viewed by each user according to its location within the virtual environment. Further, avatars associated with each user may be displayed in the mixed-reality environment. In this regard, the multiple users may interact in a multitude of ways. For instance, the users may take turns practicing such that the motion of virtual projectiles may be visible to all users. In another instance, the users may coach each other based on performance in the virtual environment. In another instance, the users may play a multi-player game in the virtual environment. By way of another example, the mixed-reality projectile-tracking simulator may provide virtual players to provide a gaming experience. For example, the mixed-reality projectile-tracking simulator may display virtual defenders (e.g., a goalie, an opponent, fielders, or the like) that may respond to the trajectory of the projectile at a selected skill level. By way of another example, the mixed-reality projectile-tracking simulator may display virtual teammates (e.g., a pitcher, a catcher, fielders, baserunners, or the like) that may similarly respond to the trajectory of the projectile at a selected skill level.

Additional embodiments of the present disclosure are directed to a mixed-reality projectile-tracking simulator having multiple user-selectable operational modes. The operational modes may include pre-defined selections of various display and/or operational settings. For example, an operational mode may include a pre-defined virtual environment such as, but not limited to, a field with goal posts, field markings, goal nets, or the like. By way of another example, an operational mode may include a pre-defined set of projectile-tracking data to display as virtual objects.

In some embodiments, a mixed-reality projectile-tracking simulator includes a training mode. A training mode may provide, but is not required to provide, an open-ended experience in which a user may practice one or more types of actions (e.g., throws or hits) and view a selected set of projectile-tracking data. For example, a training mode may allow a user to practice in a virtual environment either for fun or in preparation of an upcoming game in a known location (e.g., a known field or stadium). By way of another example, a training mode may provide minimal virtual objects to allow a user to practice with other people (e.g., pitchers, catchers, goalies, opponents, or the like), yet still visualize information such as projectile trajectories, tracking data, and historical statistics. Further, a training mode may display a wide range of trajectory views (comet tails, full persistent arcs, or the like) and/or projectile-tracking data from any combination of the projectile-tracking system and the user-tracking system to the user for immediate feedback. By way of another example, a training mode may provide optional audio and/or visual coaching feedback to provide suggestions to the user for improvements.

In some embodiments, a mixed-reality projectile-tracking simulator includes a play mode. A play mode may provide, but is not required to provide, a goal-oriented experience in which a user attempts to complete certain tasks in a selected mixed-reality environment. For example, in a play mode, a user may attempt to perform selected pitches, perform a tennis serve, hit into a selected portion of a field, make shots into targeted regions of a goal net, or the like. Accordingly, the mixed-reality projectile-tracking simulator may display data associated with whether or not the user goal was accomplished. Further, a play mode may provide a selected mixed-reality audio/visual experience. For example, a user may select visuals representing a particular stadium (e.g., a stadium of a favorite team or a stadium in which the user will play) and may further select desired audio such as, but not limited to, crowd noise. In this regard, a play mode may provide a user with an immersive mixed-reality experience. By way of another example, a play mode may also provide a game-like experience in which a user may play against a virtual player, multiple players may compete against each other, or the like.

A mixed-reality projectile-tracking simulator may display virtual objects in various ways with respect to physical objects visible to the user. For example, a virtual object may be head-locked such that the size, shape, or orientation may remain fixed in the field of view of the user regardless of the orientation or gaze direction of the user. In one instance, projectile-tracking data (launch angle, travel distance, rotations, hang time, landing location, or the like) may be displayed as head-locked virtual objects to facilitate readability. In another instance, logos and/or selection menus may be displayed as head-locked virtual data.

By way of another example, a mixed-reality projectile-tracking simulator may display a virtual object within a virtual coordinate system designed to replicate the real-world view of the user. In this regard, virtual objects may be scaled, rotated, or transformed such that virtual objects at a selected distance in the virtual coordinate system appear integrated with physical objects in the real-world view at the same distance. Further, the virtual objects may be continually updated to reflect the head orientation and/or gaze direction of the user. In some cases, a user may not perceive a difference between a physical object and a virtual object in a mixed-reality environment. Additionally, virtual objects may be placed within the virtual coordinate system at selected relative distances from each other or may be anchored to physical coordinates (e.g., global positioning system (GPS) coordinates, latitude and longitude coordinates, or the like). For instance, virtual objects representing bases of a baseball diamond, field markings, or the like may be located at fixed distances from each other in the virtual coordinate system and displayed to the user based on the location of the user within the virtual coordinate system (e.g., a location on a virtual field). Accordingly, as the user moves in the physical world, virtual objects in the mixed-reality environment may be correspondingly updated. In another instance, a configuration of a virtual field may be anchored to a particular physical location. In this regard, a user may define and associate a customizable virtual environment with a location often visited by the user. Accordingly, the mixed-reality projectile-tracking simulator may display the elements of the virtual environment any time the user visits the location.

Referring now to FIGS. 1A through 3J, a mixed-reality projectile-tracking simulator 100 is described in accordance with one or more embodiments of the present disclosure.

FIG. 1A is a block diagram of components of a mixed-reality projectile-tracking simulator 100, in accordance with one or more embodiments of the present disclosure.

In one embodiment, a mixed-reality projectile-tracking simulator 100 includes a mixed-reality near-eye display 102 to display virtual objects within the field of view of a user. In another embodiment, a mixed-reality projectile-tracking simulator 100 includes a projectile-tracking sub-system 104 configured to monitor one or more aspects of a launched projectile (e.g., a thrown or a hit projectile) such as, but not limited to, location, velocity, acceleration, launch angle, hook angle, hang time, rotation, distance travelled, or landing location. In another embodiment, the mixed-reality projectile-tracking simulator 100 includes a user-tracking sub-system 106 configured to monitor one or more aspects of user motion during an action such as, but not limited to, arm speed, arm trajectory, or an impact location on the ball during a hit. In another embodiment, the user-tracking sub-system 106 is at least partially integrated with the projectile-tracking sub-system 104. In another embodiment, the mixed-reality projectile-tracking simulator 100 includes a hitting equipment tracking sub-system 107 configured to monitor one or more aspects of motion of user equipment (e.g., a bat, a racquet, a stick, or the like) during an action such as, but not limited to, a swing sped or a swing trajectory. The hitting equipment tracking sub-system 107 may be formed as a stand-alone device or may be incorporated into another component such as, but not limited to, the user-tracking sub-system 106.

In another embodiment, the mixed-reality projectile-tracking simulator 100 includes a controller 108. In another embodiment, the controller 108 includes one or more processors 110 configured to execute program instructions maintained on a memory medium 112. In this regard, the one or more processors 110 of controller 108 may execute any of the various process steps described throughout the present disclosure.

The one or more processors 110 of a controller 108 may include any processing element known in the art. In this sense, the one or more processors 110 may include any microprocessor-type device configured to execute algorithms and/or instructions. It is further recognized that the term "processor" may be broadly defined to encompass any device having one or more processing elements, which execute program instructions from a non-transitory memory medium 112. For example, the processors 110 may include one or more microprocessors, microcontrollers, or the like. By way of another example, the processors 110 may include hardwired logic circuitry such as, but not limited to, one or more application-specific integrated circuits (ASICs), programmable logic devices (PLDs), or field programmable gate arrays (FPGAs).

The memory medium 112 may include any storage medium known in the art suitable for storing program instructions executable by the associated one or more processors 110. For example, the memory medium 112 may include a non-transitory memory medium. By way of another example, the memory medium 112 may include, but is not limited to, a read-only memory (ROM), a random-access memory (RAM), a magnetic or optical memory device (e.g., disk), a magnetic tape, a solid-state drive, and the like. It is further noted that memory medium 112 may be housed in a common controller housing with the one or more processors 110. In one embodiment, the memory medium 112 may be located remotely with respect to the physical location of the one or more processors 110 and controller 108. For instance, the one or more processors 110 of controller 108 may access a remote memory (e.g., server), accessible through a network (e.g., internet, intranet, and the like). Therefore, the above description should not be interpreted as a limitation on the present invention but merely an illustration.

The controller 108 may be communicatively coupled to various components of the mixed-reality projectile-tracking simulator 100 such as, but not limited to, the near-eye display 102, the projectile-tracking sub-system 104, or the user-tracking sub-system 106 to carry out steps described throughout the present disclosure. For example, the controller 108 may receive data from the projectile-tracking sub-system 104 and/or the user-tracking sub-system 106 associated with a user action, process and/or analyze the data, generate a predicted trajectory of the ball, and direct the near-eye display 102 to display virtual objects representing the motion of the ball along the predicted trajectory to the user. By way of another example, the controller 108 may receive image, video, and/or audio data from the near-eye display 102 including physical objects within a field of view of the user, generate a mapping of the physical objects, render virtual objects within a virtual coordinate system to integrate with the physical objects, and direct the near-eye display 102 to display the virtual objects.

The steps described throughout the present disclosure may be carried out by a single controller 108 or, alternatively, multiple controllers. Additionally, the controller 108 may include one or more controllers housed in a common housing or within multiple housings. For example, the controller 108 may be integrated within and/or distributed within any number of components within the mixed-reality projectile-tracking simulator 100. In this regard, various processing tasks required to perform steps described throughout the present disclosure may be distributed to suitable components based on factors such as, but not limited to, processing power, memory, or physical space requirements of any component in the mixed-reality projectile-tracking simulator 100.

In one embodiment, the controller 108 may be fully or partially integrated into the near-eye display 102. In another embodiment, the controller 108 is at least partially distributed to additional components of the mixed-reality projectile-tracking simulator 100 such as the projectile-tracking sub-system 104 or the user-tracking sub-system 106. For example, it may be the case that the additional system components may have increased processing and/or memory capabilities such that the performance of the mixed-reality projectile-tracking simulator 100 may be improved by offloading at least a portion of processing steps described throughout the present disclosure. In another embodiment, the controller 108 is at least partially distributed to a mobile computing device such as, but not limited to, a mobile phone, a tablet computing device, or a laptop communicatively coupled to or integrated within the mixed-reality projectile-tracking simulator 100.

Figure 1B:
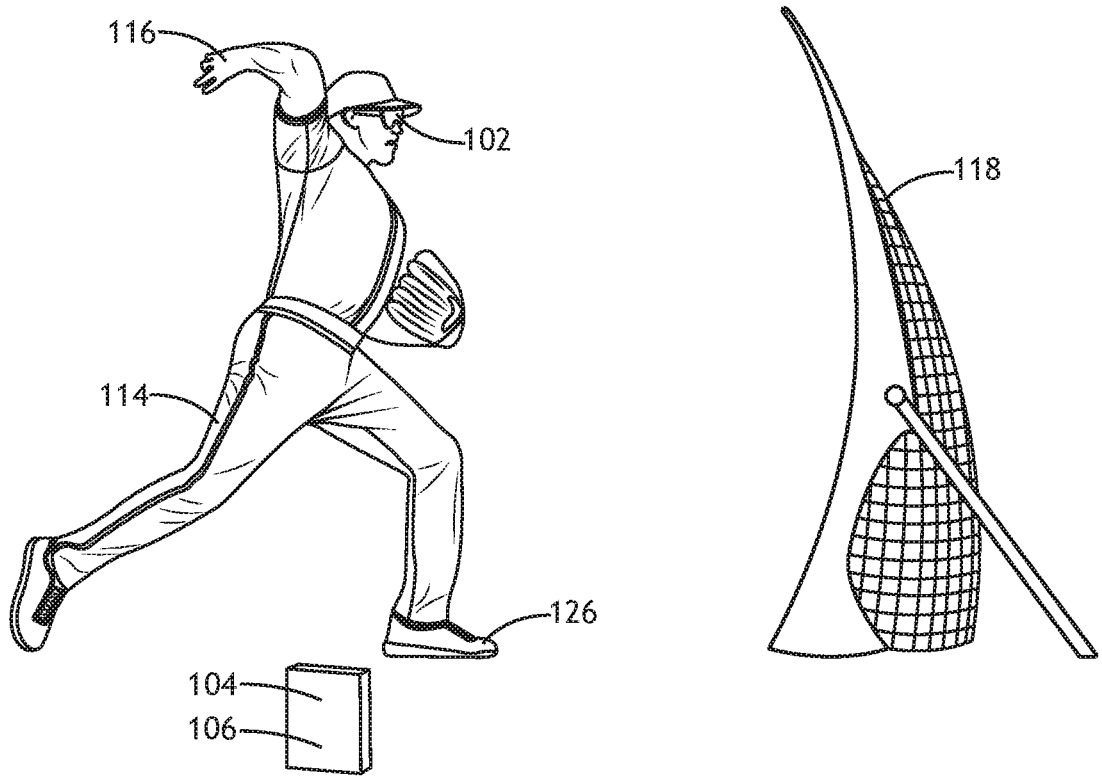
FIG. 1B is a conceptual view of a user throwing a baseball into a net, in accordance with one or more embodiments of the present disclosure.

Referring now to FIGS. 1B through 3F, the interaction of a user 114 with the mixed-reality projectile-tracking simulator 100 is illustrated in accordance with one or more embodiments of the present disclosure. In one embodiment, the user 114 throws a projectile 116 in a constrained environment such that the trajectory of the projectile 116 it at least partially limited by a containment device (e.g., a net 118, a tether (not shown), or the like). For example, FIG. 1B is a conceptual view of a user 114 throwing a baseball projectile 116 into a net 118, in accordance with one or more embodiments of the present disclosure.

Figure 1C:
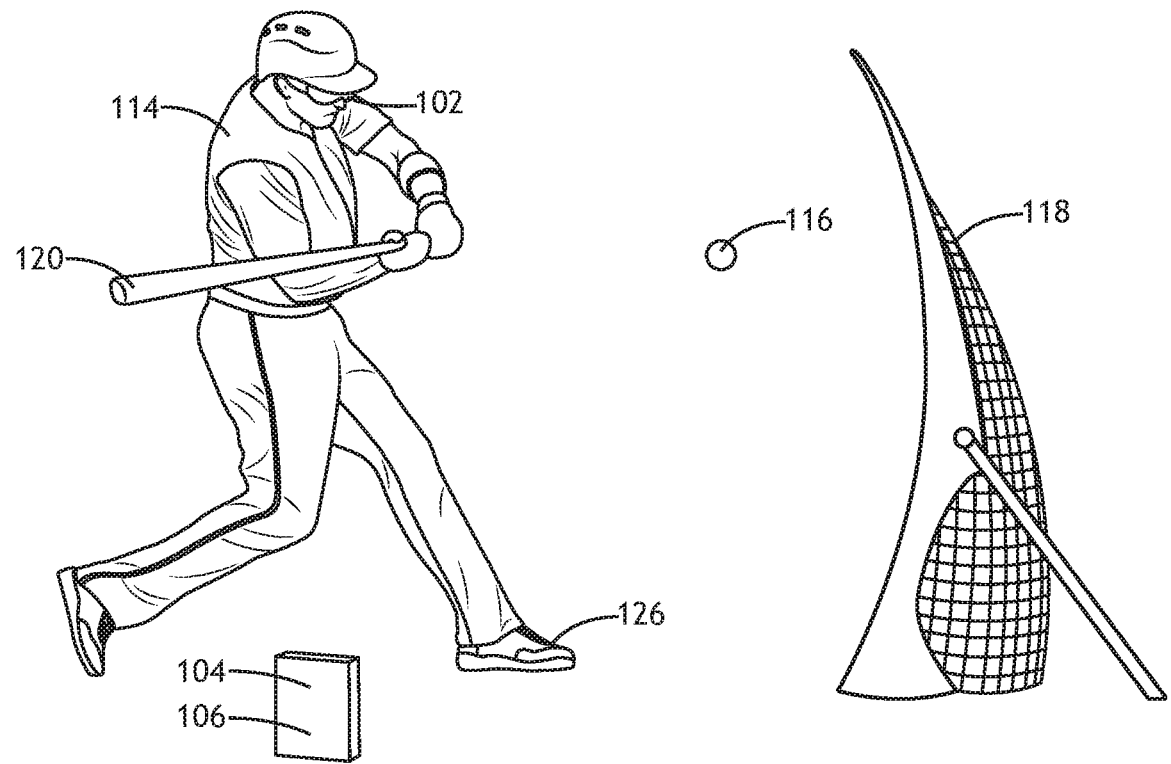
FIG. 1C is a conceptual view of a user hitting a baseball with a bat into a net, in accordance with one or more embodiments of the present disclosure.
Figure 1D:
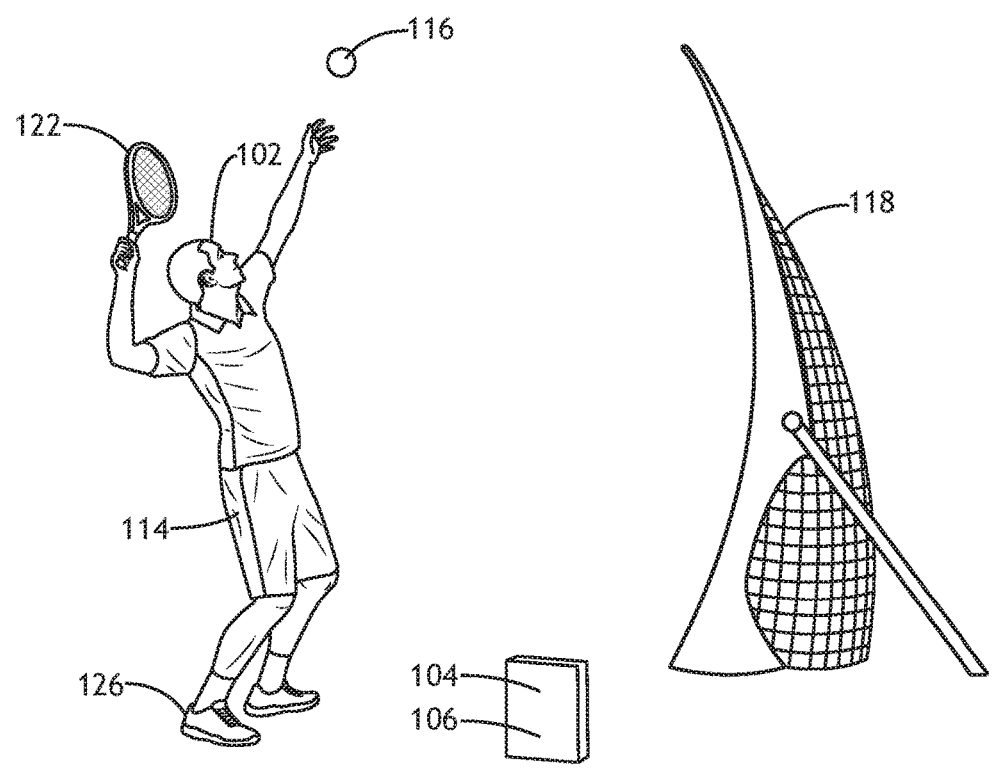
FIG. 1D is a conceptual view of a user serving a tennis ball with a racquet into a net, in accordance with one or more embodiments of the present disclosure.
Figure 1E:
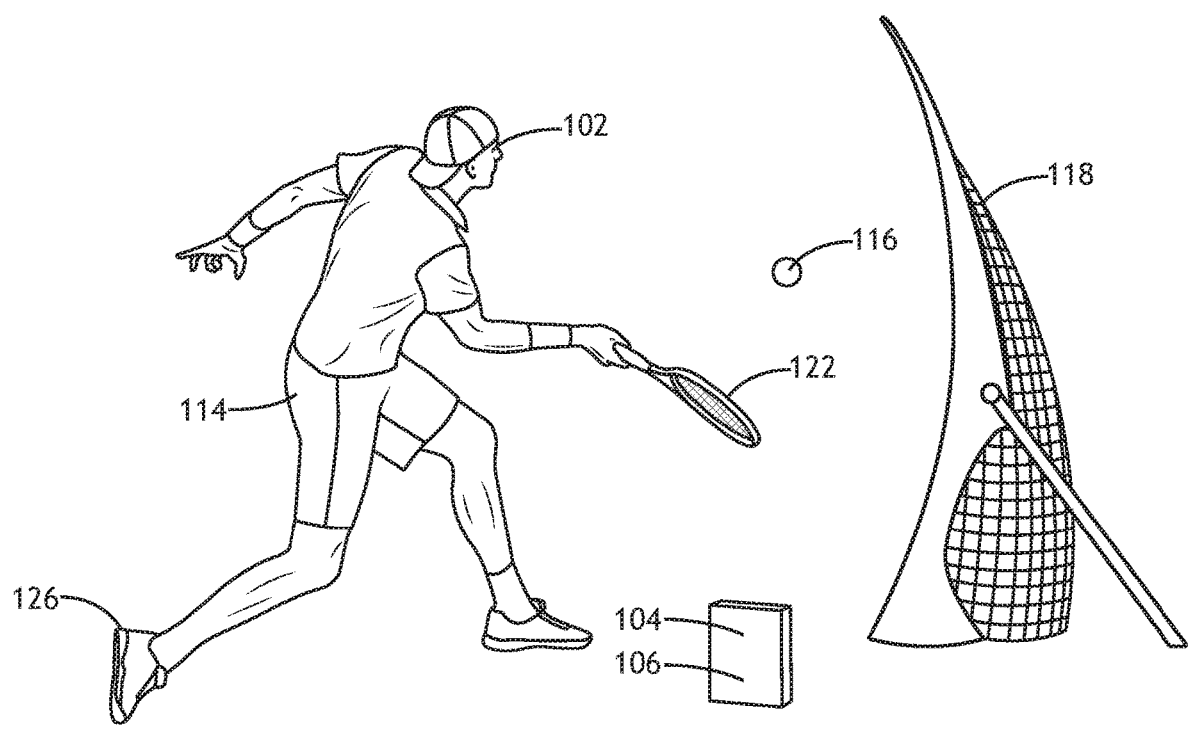
FIG. 1E is a conceptual view of a user hitting an incoming tennis ball with a racquet into a net, in accordance with one or more embodiments of the present disclosure.
Figure 1F:
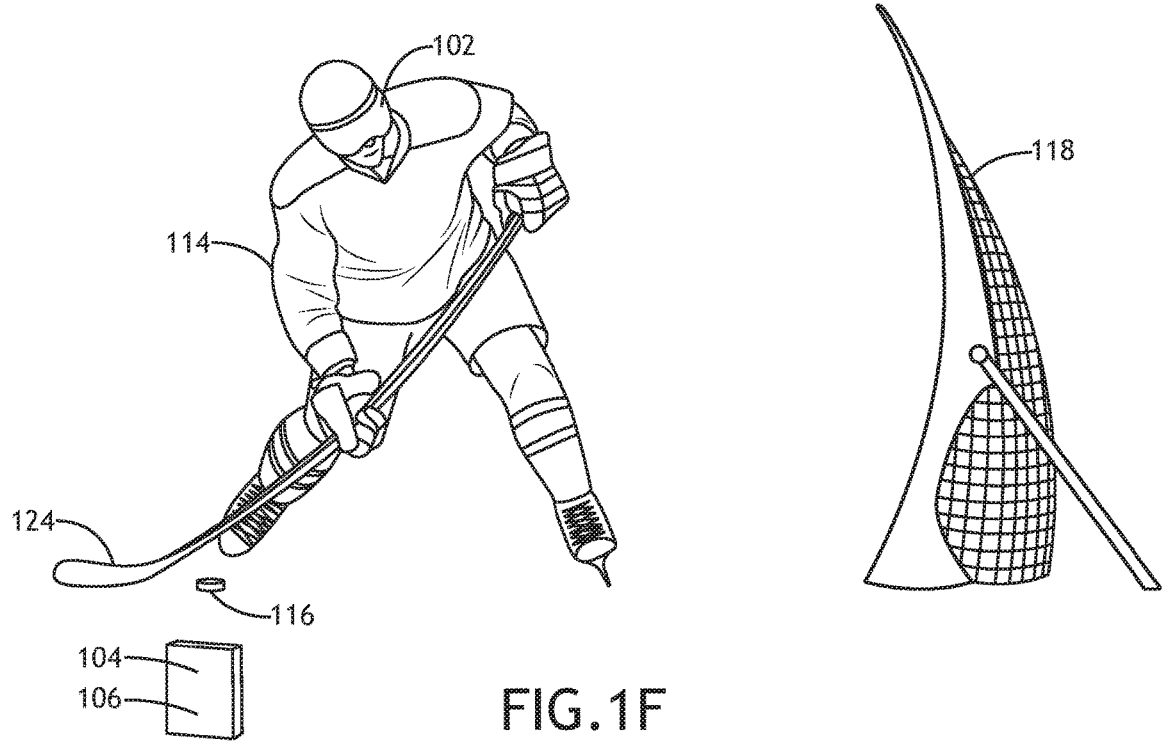
FIG. 1F is a conceptual view of a user hitting a hockey puck with a stick into a net, in accordance with one or more embodiments of the present disclosure.
Figure 1G:
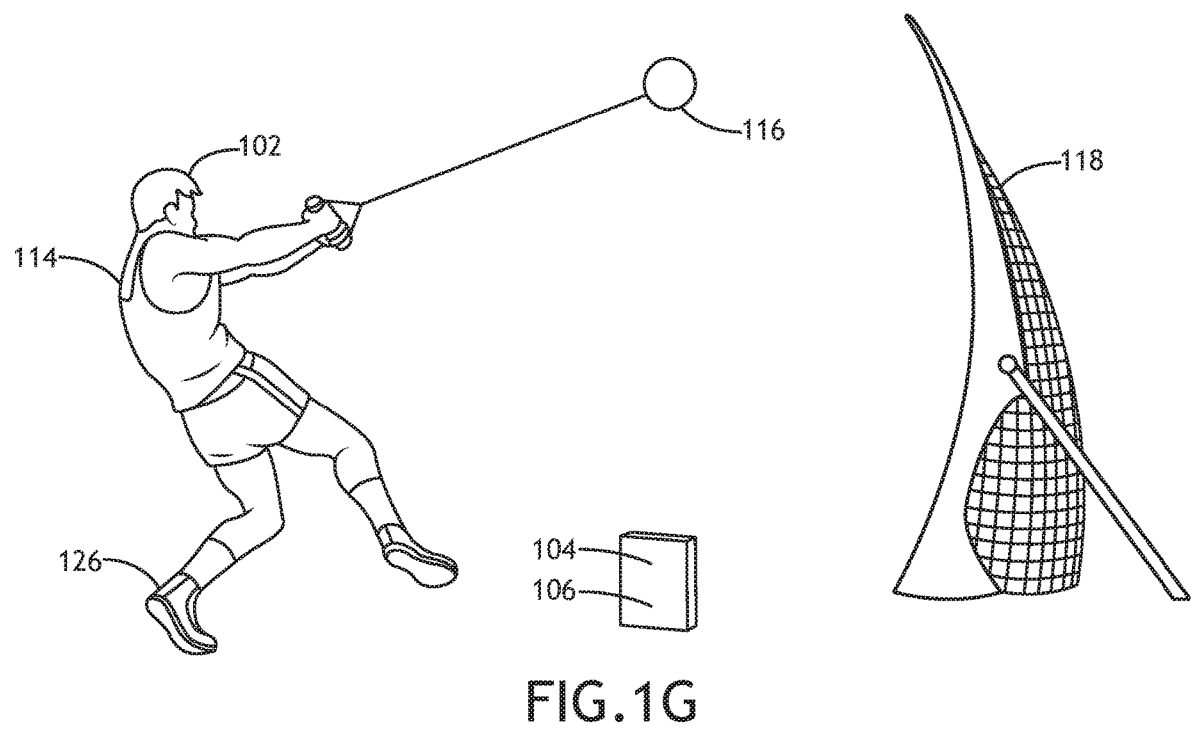
FIG. 1G is a conceptual view of a user throwing a hammer into a net, in accordance with one or more embodiments of the present disclosure.

In another embodiment, the user 114 hits a projectile 116 into a containment device. The projectile 116 may be set in motion by the user 114 or the user 114 may hit an approaching projectile 116 (e.g., thrown or hit by another player, a training machine, or the like). Further, the user 114 may hit the projectile 116 with any selected piece of sporting equipment such as, but not limited to, a bat 120, a racquet 122, a stick 124, or the like. For example, FIG. 1C is a conceptual view of a user 114 hitting a baseball projectile 116 with a bat 120 into a net 118, in accordance with one or more embodiments of the present disclosure. By way of another example, FIG. 1D is a conceptual view of a user 114 serving a tennis ball projectile 116 with a racquet 122 into a net 118, in accordance with one or more embodiments of the present disclosure. By way of another example, FIG. 1E is a conceptual view of a user 114 hitting an incoming tennis ball projectile 116 with a racquet into a net 118, in accordance with one or more embodiments of the present disclosure. By way of another example, FIG. 1F is a conceptual view of a user 114 hitting a hockey puck projectile 116 with a hockey stick 124 into a net 118, in accordance with one or more embodiments of the present disclosure. By way of another example, FIG. 1G is a conceptual view of a user throwing a hammer into a net 118, in accordance with one or more embodiments of the present disclosure.

It is to be understood, however, that the mixed-reality projectile-tracking simulator 100 may be used with any type of projectile 116 such as, but not limited to, a baseball (e.g., as shown in FIGS. 1B and 1C), a softball, a tennis ball (e.g., as shown in FIGS. 1D and 1E), a hockey puck (e.g., as shown in FIG. 1F), a javelin, a discus, or a shotput.

In another embodiment, the projectile-tracking sub-system 104 is positioned to track the projectile 116 during an action (e.g., a throw or a hit) and throughout a launch window. For example, the projectile-tracking sub-system 104 may track one or more aspects of the projectile 116 (e.g., location, velocity, acceleration, rotation, or the like) until the motion of the projectile 116 is impeded by the containment device. In another embodiment, the user-tracking sub-system 106 are positioned to track the motion of the user 114 during the action. In another embodiment, a user 114 wears the near-eye display 102 while launching the projectile 116 (e.g., throwing or hitting the projectile 116). In this regard, the near-eye display 102 may display a mixed-reality environment to the user 114 in which one or more virtual objects are displayed within the real-world view of the user 114. For example, the near-eye display 102 may display a virtual projectile travelling along a predicted trajectory in the mixed-reality scene based on data from the projectile-tracking sub-system 104 over the launch window and/or the user-tracking sub-system 106. By way of another example, the near-eye display 102 may display virtual objects such as, but not limited to, projectile-tracking data, user-tracking data, coaching feedback, avatars representing the user, virtual players, additional users of connected systems, or the like.

It is to be further understood that the mixed-reality projectile-tracking simulator 100 is not limited to throwing or hitting the projectile 116 into a containment device. In one embodiment, the user 114 may throw or hit the projectile 116 in an open area (e.g., an open field) and the mixed-reality projectile-tracking simulator 100 (e.g. via the projectile-tracking sub-system 104) may generate projectile-tracking data for a complete trajectory. Further, the near-eye display 102 may display projectile-tracking data, coaching feedback, avatars representing the user and/or additional users, or the like based on the projectile-tracking data over the complete trajectory.

Figure 2A:
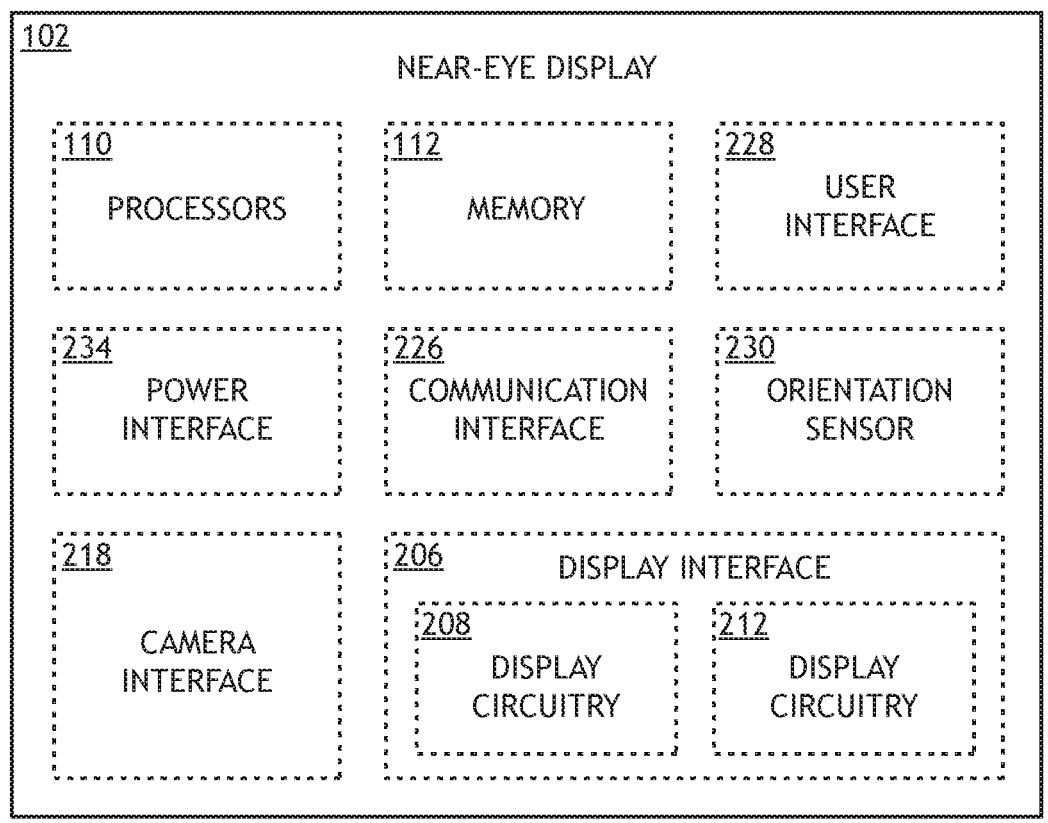
FIG. 2A is a block diagram of components of a near-eye display, in accordance with one or more embodiments of the present disclosure.
Figure 2B:
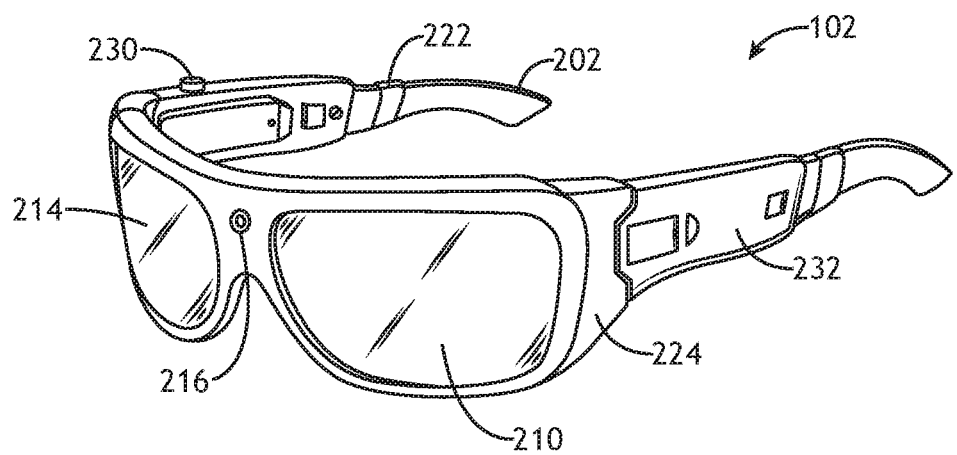
FIG. 2B is a perspective view of mixed-reality glasses including a near-eye display, in accordance with one or more embodiments of the present disclosure.

The near-eye display 102 may include any type of mixed-reality display known in the art. Further, the near-eye display 102 may have any form-factor suitable for displaying mixed-reality virtual objects to the user such as, but is not limited to, an eyeglass display device, contact lens display devices, a headset display device, a helmet, or the like. In addition, the near-eye display 102 may be formed using custom components or may be formed at least in part using off-the-shelf components. For example, commercially-available near-eye displays suitable for integration within the mixed-reality projectile-tracking simulator 100 may include, but are not limited to, a Microsoft HoloLens or an ODG R-9. FIG. 2A is a block diagram of components of a near-eye display 102, in accordance with one or more embodiments of the present disclosure. FIG. 2B is a perspective view of mixed-reality glasses 202 including a near-eye display 102, in accordance with one or more embodiments of the present disclosure. It is recognized herein that mixed-reality glasses including a near-eye display 102 may provide a light-weight mixed-reality interface suitable for a wide range of conditions and practice environments. FIG. 2C includes a perspective view 200 and an exploded view 201 of a mixed-reality baseball helmet 204 including a near-eye display 102, in accordance with one or more embodiments of the present disclosure. It is recognized herein that a helmet including a near-eye display 102 may provide mixed-reality simulation and training in a user-experience similar to a real-world sporting experience. Further, the near-eye display 102 may be discretely integrated into a helmet such that the components of the near-eye display 102 may not distract or provide discomfort to the user during practice or training with the mixed-reality projectile-tracking simulator 100. In addition, a helmet including a near-eye display 102 may be indistinguishable from a standard helmet such that such that others may be unaware that the user 114 is using the mixed-reality projectile-tracking simulator 100.

In one embodiment, the near-eye display 102 includes one or more processors 110 and/or a memory medium 112. In this regard, the controller 108 may be at least partially integrated within the near-eye display 102. For example, processors 110 of the near-eye display 102 may perform various processing tasks described throughout the present disclosure such as, but not limited to, identifying physical objects within a field of view of the user or rendering virtual objects for display to the user 114 based on a field of view and/or a gaze direction of the user 114.

In another embodiment, the near-eye display 102 includes a display interface 206 including left-eye display circuitry 208 configured to drive a left-eye display element 210 and right-eye display circuitry 212 configured to drive a right-eye display element 214. In this regard, the display interface 206 may selectively display virtual objects to the left and/or the right eye of the user 114. For example, the display interface 206 may include one or more light projectors (not shown), driven by the left-eye display circuitry 208 and the right-eye display circuitry 212, to project light visible to the user 114 such that the user 114 may view the virtual objects within the user's field of view.

The left-eye display element 210 and the right-eye display element 214 may include any type of display elements suitable for presenting a mixed-reality environment to a user 114. In another embodiment, the left-eye display element 210 and the right-eye display element 214 may include a partially-transparent material to allow the user 114 to view real-world objects such as the projectile 116 through the near-eye display 102 and simultaneously facilitate the display of virtual objects to the user 114. For example, as illustrated in FIG. 2B, the left-eye display element 210 and the right-eye display element 214 may include a partially-transparent material formed as lenses of mixed-reality glasses 202. By way of another example, as illustrated in FIG. 2C, the left-eye display element 210 and the right-eye display element 214 may include a partially-transparent material mounted to a faceplate of a mixed-reality baseball helmet 204.

Further, the partially-transparent material may include any type of material. In one embodiment, the left-eye display element 210 and the right-eye display element 214 are formed from a glass material such as, but not limited to, a glass material or a plastic material. In another embodiment, the left-eye display element 210 and the right-eye display element 214 may include one or more coatings. For example, the left-eye display element 210 and the right-eye display element 214 may include anti-reflection and/or anti-glare coatings to provide a comfortable viewing experience. By way of another example, the left-eye display element 210 and the right-eye display element 214 may include a polarization coating to transmit or reflect select polarizations of light. Further, the left-eye display element 210 and the right-eye display element 214 may provide variable transparency through any technique known in the art such as, but not limited to, selective polarization of light. For example, it may be desirable to provide relatively high transparency when a user 114 is required to see and/or interact with physical objects such as the projectile 116. By way of another example, it may be desirable to provide relatively low transparency when projecting an opaque virtual scene to the user 114 such as, but not limited to, after the projectile 116 has been launched and motion of a virtual ball through a virtual scene is presented to the user 114.

Further, the display interface 206 may display virtual objects using any technique known in the art. In one embodiment, the display interface 206 projects light associated with virtual reality objects onto the left-eye display element 210 and/or the right-eye display element 214 such that the left-eye display element 210 and/or the right-eye display element 214 operate as a screen within the a portion of the field of view. In another embodiment, the display interface 206 projects light associated with virtual reality objects directly onto the retinas of the user 114. In this regard, the left-eye display element 210 and/or the right-eye display element 214 may operate as mirrors that direct light into the eyes of the user 114.

In another embodiment, the near-eye display 102 includes an integrated camera 216 for photometric positional detection driven by a camera interface 218. In another embodiment, the near-eye display 102 includes one or more orientation sensors 220 to determine the head orientation and/or gaze direction in three-dimensional space. For example, the near-eye display 102 may include an inertial measurement unit (IMU) for sensing angular and/or linear rate of change and/or magnetic orientation. By way of another example, the near-eye display 102 includes Global Positioning System (GPS) sensors for satellite detection of position of the near-eye display 102 relative to the earth.

In another embodiment, the near-eye display 102 includes an audio output component 222 and/or a microphone 224 for audio interaction with the user 114. For example, the audio output component 222 may include, but is not limited to, a speaker or fitted earphones to provide audio feedback to the user. The audio feedback may include, but is not limited to, voice narration, commands, instructions, or sound effects. By way of another example, the microphone 224 may allow the user 114 to provide voice commands and/or interact with other users within a virtual environment. The microphone 224 may further monitor external sounds, such as the impact with the projectile 116, the landing of the projectile 116, breathing patterns of the user 114, or the like.

In another embodiment, the near-eye display 102 includes a communication interface 226 to communicate with additional components of the mixed-reality projectile-tracking simulator 100 such as the projectile-tracking sub-system 104, the user-tracking sub-system 106, or an external controller 108. The communication interface 226 may include circuitry (e.g., transmitters, receivers, buffers, amplifiers, filters, or the like) for any type of wired or wireless communication standard known the art such as, but not limited to, WiFi, Bluetooth 4.0 (including Bluetooth Low Energy (BLE)), Bluetooth 5.0, Bluetooth Low Energy (BLE), Zigbee, XBee, ZWave, or a custom standard.

It is recognized herein that various communication bands such as, but not limited to, bands associated with cellular phone communication, WiFi, or Bluetooth may become crowded and/or noisy in public places such as athletic stadiums during a game. In this regard, a communication interface 226 operating on a crowded or noisy communication band may exhibit decreased performance. Further, it may be desirable to provide communication over distances at least as long as an athletic field. For example, a user 114 may roam around a field, while the near-eye display 102 communicates to an external controller 108 (e.g., providing at least a portion of processing power required to perform steps described throughout the present disclosure) located at a fixed location. Accordingly, it is contemplated herein that a communication interface 226 of a mixed-reality projectile-tracking simulator 100 may support a broad range of communication techniques across a wide range of frequency bands and that different communication techniques and/or frequency bands may be selected for different applications and intended uses. In one embodiment, the communication interface 226 includes circuitry for communication using multiple communication bands and/or standards. Further, the communication interface 226 may scans multiple communication bands and select a communication band and/or standard to facilitate a high signal to noise ratio. In another embodiment, the communication interface 226 includes circuitry for spread-spectrum communication techniques such as, but not limited to, frequency-hopping, time-hopping, direct-sequence, or chirp-based spread spectrum techniques. It is recognized herein that spread-spectrum communication may provide various benefits including, but not limited to, resistance to interference from crowded bands and a capacity for long-range communication. For example, the communication interface 226 may provide spread-spectrum communication over public wireless frequencies such as, but not limited to, 900 MHz bands to provide long range (e.g., up to 20 miles) communication.

In another embodiment, the near-eye display 102 includes a user interface 228 to facilitate user interaction. For example, the user interface 228 may include circuitry for providing a series of menus with user-selectable options such that a user 114 may navigate through the menus and adjust the configuration of the mixed-reality projectile-tracking simulator 100. By way of another example, the user interface 228 may include buttons, sliders, toggle switches, or touch sensors for tactile interaction. The components of the user interface 228 may be located on any user-accessible portion of the near-eye display 102. such as, but not limited to, a frame of mixed-reality glasses 202 (FIG. 2B) or within an opening of a mixed-reality baseball helmet 204 (FIG. 2C). For instance, as illustrated in FIGS. 2B, the user interface 228 may include one or more buttons 230 or a touch-sensitive slider 232. In this regard, the user 114 may slide a finger along the slider 232 to quickly adjust the display of the mixed-reality scene such as, but not limited to, adjusting a user location on a mixed-reality field to select a specific field location, adjusting the volume of crowd noise, or scroll through menus. The user 114 may then make selections by pressing the buttons 230, tapping the slider 232, or the like. By way of another example, the user interface 228 includes the microphone 224 to accept audio commands. By way of another example, the user interface 228 includes an eye-tracking camera and associated circuitry suitable for determining the gaze direction of the user 114. For instance, the eye-tracking camera may be integrated with the Accordingly, a user 114 may interact with the near-eye display 102 through a series of eye-based gestures such as, but not limited to, eye movements to indicate scrolling and long blinks to indicate selection of the last-viewed item. In another embodiment, the user interface 228 may include a communicatively coupled device such as, but not limited to, a mobile phone, a tablet computing device, or a laptop that communicates with the near-eye display 102 via the communication interface 226. In this regard, the user 114 may adjust the mixed-reality environment provided by the near-eye display 102 in a program, an application (e.g., an "app"), through a web-based interface, or the like.

In another embodiment, the near-eye display 102 includes a power interface 234. For example, the power interface 234 may include a battery such as, but not limited to rechargeable lithium ion or nickel-cadmium batteries. By way of another example, the power interface 234 may include of battery charging circuity suitable for charging a rechargeable battery. For instance, the power interface 234 may include a receptacle to receive a wired power cord. In another instance, the power interface 234 may include circuitry for wireless battery charging.

In another embodiment, the projectile-tracking sub-system 104 is positioned (e.g., by the user 114) to track the projectile 116 as it is launched by the user 114. For example, the projectile-tracking sub-system 104 may be configured to track the projectile 116 over the launch window starting at a selected time prior to impact and ending at a selected time after the kick. In this regard, the user 114 may operate the mixed-reality projectile-tracking simulator 100 in a location where the travel distance of the projectile 116 is limited (e.g., by a containment device including a net, a tether, or the like). Accordingly, the launch window over which the projectile-tracking sub-system 104 tracks the projectile 116 may end at or before the time at which the motion of the projectile 116 is impeded by the containment device.

Figure 3A:
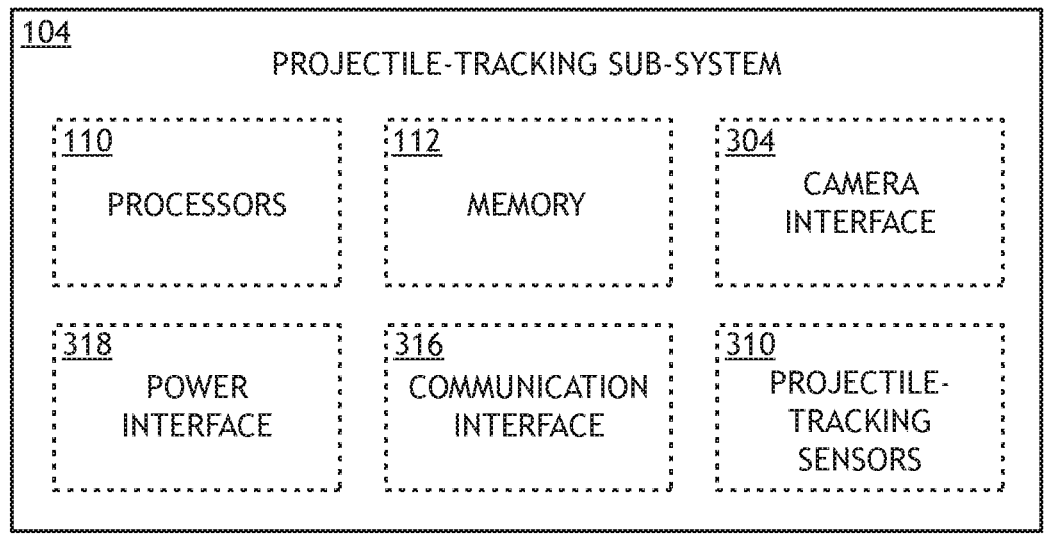
FIG. 3A is a block diagram of components of a projectile-tracking sub-system, in accordance with one or more embodiments of the present disclosure.
Figure 3B:
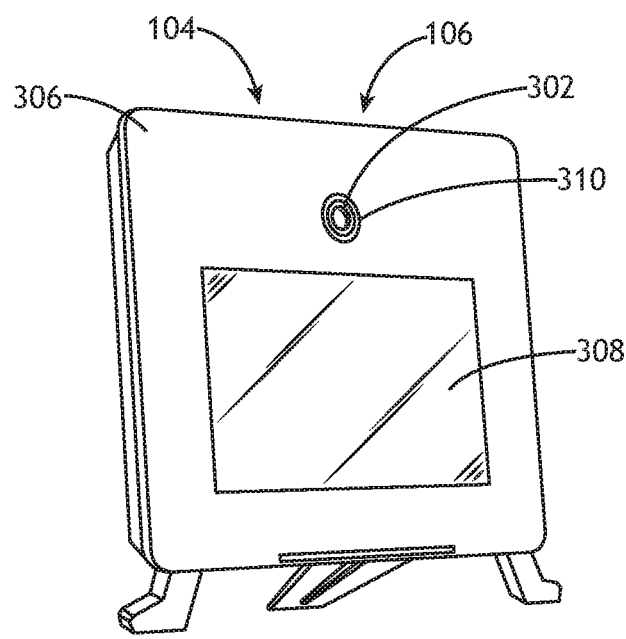
FIG. 3B is a perspective view of a projectile-tracking sub-system with a camera configured to be positioned by the user to capture images and/or video of the projectile during a launch, in accordance with one or more embodiments of the present disclosure.
Figure 3C:
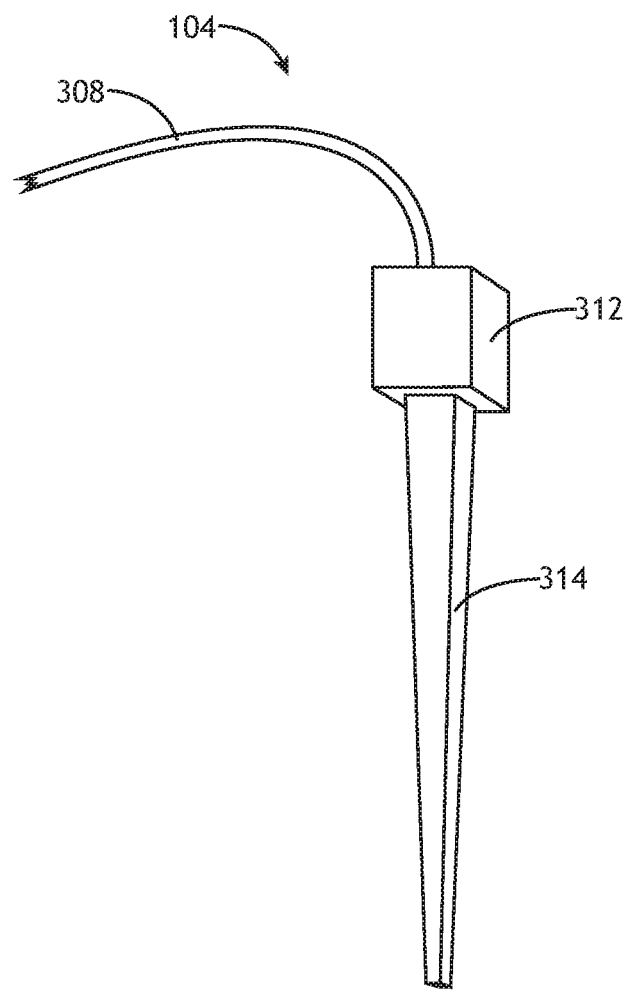
FIG. 3C is a perspective view of a projectile-tracking sub-system with a tether to be fastened to a projectile, in accordance with one or more embodiments of the present disclosure.

Referring now to FIGS. 3A through 3D, the projectile-tracking sub-system 104 may include any number or type of components known the art suitable for tracking a projectile 116 over a selected launch window (e.g., after being thrown or hit by the user 114). Further, the components of the projectile-tracking sub-system 104 may be configured with any form-factor. In addition, the projectile-tracking sub-system 104 may be formed using custom components or may be formed at least in part using off-the-shelf components. For example, commercially available projectile-tracking products suitable for integration within the mixed-reality projectile-tracking simulator 100 may include, but are not limited to, products provided by FlightScope, Trackman, Foresight Sports, or Ernest Sports. FIG. 3A is a block diagram of components of a projectile-tracking sub-system 104, in accordance with one or more embodiments of the present disclosure. FIG. 3B is a perspective view of a projectile-tracking sub-system 104 with a camera 302 configured to be positioned by the user 114 to capture images and/or video of the projectile 116 during an action (e.g., as illustrated in FIGS. 1B through 1F), in accordance with one or more embodiments of the present disclosure. FIG. 3C is a perspective view of a projectile-tracking sub-system 104 with a tether 308 to be fastened to a projectile 116, in accordance with one or more embodiments of the present disclosure.

In one embodiment, the controller 108 may be fully or partially integrated into the projectile-tracking sub-system 104. In another embodiment, the controller 108 is at least partially distributed to additional components of the mixed-reality projectile-tracking simulator 100 such as the near-eye display 102 or the user-tracking sub-system 106. For example, it may be the case that the additional system components may have increased processing and/or memory capabilities such that the performance of the mixed-reality projectile-tracking simulator 100 may be improved by offloading at least a portion of processing steps described throughout the present disclosure. In another embodiment, the controller 108 is at least partially distributed to a mobile computing device such as, but not limited to, a mobile phone or a laptop communicatively coupled to or integrated within the mixed-reality projectile-tracking simulator 100.

In one embodiment, the projectile-tracking sub-system 104 includes camera interface 304 to receive images and/or video of the projectile 116 from the camera 302. For example, as illustrated in FIG. 3A, the projectile-tracking sub-system 104 may include one or more stand-alone units 306 configured to be placed near the projectile 116. In one instance, as illustrated in FIG. 1B, a projectile-tracking sub-system 104 may be placed with a camera 302 orthogonal to a plane of motion to generate a side view of the projectile 116. In another embodiment, the projectile-tracking sub-system 104 may be placed with a camera 302 configured to view the motion of the projectile 116 from the perspective of the user 114. For example, the camera 216 of the near-eye display 102 may operate as a projectile-tracking sub-system 104. Further, the mixed-reality projectile-tracking simulator 100 may generally include more than one projectile-tracking sub-system 104 to provide more than one camera 302 suitable for viewing various aspects of an action from multiple angles such as to facilitate accurate tracking of the projectile 116. For instance, the camera 302 may capture the movement of a user's body prior to throwing or hitting the projectile 116, the impact of equipment (e.g., a bat 120, a racquet 122, a stick 124, or the like) with the projectile 116, or the like.

In another embodiment, the projectile-tracking sub-system 104 includes a display 308. For example, the display 308 may visualize the images and/or video from the camera 302. Accordingly, the user 114 may utilize the images and/or video to position the projectile-tracking sub-system 104 at a suitable location to view the projectile 116 during a launch. In one embodiment, the projectile-tracking sub-system 104 may store images and/or video captured during a launch such that the user 114 may play back the captured images and/or video to analyze technique. The display 308 may be any type of display known in the art such as, but not limited to, a liquid crystal display (LCD), a light-emitting diode (LED) display, or an organic light-emitting diode (OLED) display. In another embodiment, the display 308 is a touch-sensitive display providing an interactive user interface.

In another embodiment, the projectile-tracking sub-system 104 includes one or more additional user interface components such as, but not limited to, buttons, sliders or switches suitable for receiving user input for configuration and/or operation.

In another embodiment, the projectile-tracking sub-system 104 includes one or more dedicated projectile-tracking sensors 310 to gather data regarding one or more aspects of the motion of the projectile 116. The projectile-tracking sensors 310 may generally include any type of sensor known in the art. Further, the projectile-tracking sensors 310 may generate stand-alone data or may rely on other components such as, but not limited to, the camera 302.

In one embodiment, the projectile-tracking sensors 310 include range-finding sensors configured to track the position of the projectile 116 over the launch window. For example, the projectile-tracking sensors 310 may include a range finder. In this regard, the projectile-tracking sensors 310 may emit a signal in the direction of the projectile 116, detecting a reflected signal from the projectile 116, and determine the distance to the projectile 116 by monitoring the time of flight of the signal. For instance, a projectile-tracking sensors 310 may include a Radio Detection and Ranging (RADAR) system utilizing radio-frequency pulses for range finding. Accordingly, a RADAR system may include a source of radio-frequency pulses of any selected frequency or range of frequencies, a radio-frequency transmitter to transmit the radio-frequency pulses, and a radio-frequency receiver to detect reflected radio-frequency pulses. In another instance, projectile-tracking sensors 310 may include a Light Detection and Ranging (LIDAR) system utilizing light-pulses for range-finding. Accordingly, a LIDAR system may include a light source to generate pulses of light with any selected wavelength or range of wavelengths, one or more lenses to project the light pulses and capture light reflected from the projectile 116, and a light detector to detect the captured light pulses. The light source may include any source known in the art such as, but not limited to a laser source. Accordingly, projectile-tracking sensors 310 incorporating laser-based range-finding may be characterized as Laser Detection and Ranging (LADAR) systems.

In another embodiment, the projectile-tracking sensors 310 include one or more velocity sensors to track the velocity of the projectile 116. For example, the projectile-tracking sensors 310 may include Doppler sensors to determine velocity of the projectile 116 based on shifts in the wavelength (or frequency) of a signal reflected from the projectile 116 (e.g., Doppler shifts that are a function of the velocity and direction of motion relative to the sensor). Further, Doppler sensors may utilize pulses of radio waves or light pulses and may be integrated with a range-tracker described above through the addition of a wavelength-sensitive (or frequency-sensitive) detector such as a spectrometer.

In another embodiment, the projectile-tracking sensors 310 may include a force sensor attached to the projectile 116. For example, as illustrated in FIG. 3C, a projectile-tracking sub-system 104 may include a force sensor 312 (e.g., a strain gauge, or the like) attached to the projectile 116 by a tether 308 and secured to the ground (e.g., by stake 314). Accordingly, the projectile 116 may travel along an initial trajectory for the length of a tether 308 and will then be stopped by the tether 308, which will produce a measurable force that may be detected using the force sensor 312. Further, data associated with the velocity and/or acceleration of the projectile 116 at the end of the launch window may be determined by the force sensor 312.

The tether 308 may be secured to the projectile 116 using any method known in the art. For example, the tether 308 may include, but is not limited to, rope, string, or wire. By way of another, the tether 308 may be attached to the projectile 116 by a removable harness enabling the user 114 to use any type of projectile 116 with the mixed-reality projectile-tracking simulator 100. By way of another example, the tether 308 may be permanently attached to the projectile 116 at one or more attachment points. In this regard, a user 114 may use a dedicated projectile 116 designed for use with the mixed-reality projectile-tracking simulator 100.

In another embodiment, the projectile-tracking sensors 310 include weather-monitoring sensors. It is recognized herein that weather conditions such as, but not limited to, air temperature, air pressure, wind speed, and precipitation (fog, rain, snow, sleet, or the like) may impact the trajectory of a launched ball. Accordingly, the projectile-tracking sensors 310 may include weather-monitoring sensors such as, but not limited to air temperature sensors, air pressure sensors, wind speed sensors, or precipitation sensors.

In another embodiment, the projectile-tracking sub-system 104 includes a communication interface 316 to communicate with additional components of the mixed-reality projectile-tracking simulator 100 such as the near-eye display 102, the user-tracking sub-system 106, or an external controller 108. The communication interface 316 may include circuity (e.g., transmitters, receivers, buffers, amplifiers, filters, or the like) for any type of wired or wireless communication standard known the art such as, but not limited to, WiFi, Bluetooth 4.0 (including Bluetooth Low Energy (BLE)), Bluetooth 5.0, Bluetooth Low Energy (BLE), Zigbee, XBee, ZWave, or a custom standard. In a general sense, the communication interface 316 may include any of the same or complementary communication technologies as the communication interface 226 of the near-eye display 102 described previously herein such as, but not limited to, channel-scanning technology or spread-spectrum communication.

In another embodiment, the projectile-tracking sub-system 104 includes a power interface 318. For example, the power interface 318 may include a battery such as, but not limited to rechargeable lithium ion or nickel-cadmium batteries. By way of another example, power interface 318 may include of battery charging circuity suitable for charging a rechargeable battery. For instance, the power interface 318 may include a receptacle to receive a wired power cord. In another instance, the power interface 318 may include circuitry for wireless battery charging.

In another embodiment, one or more components of the projectile-tracking sub-system 104 is integrated on or within the projectile 116. For example, the projectile 116 may include reflective tape to facilitate the reflection of signals from ground-based projectile-tracking sensors 310 (e.g., range-finders, Doppler sensors, or the like). By way of another example, as illustrated in FIGS. 3D through 3J, the projectile 116 may include one or more projectile-tracking sensors 310 to generate data within the projectile 116 that may be communicated (e.g., via the communication interface 316) to additional components of the mixed-reality projectile-tracking simulator 100 such as the near-eye display 102, a stand-alone projectile-tracking sub-system 104, an external controller 108, or the like.

The projectile-tracking sensors 310 may be placed at any number of locations throughout the projectile 116 suitable for providing projectile-tracking information (e.g., forces on the projectile 116, location, speed, acceleration, rotation, or the like). Further, it is recognized herein that it may be desirable that the projectile-tracking sensors 310 have minimal impact on the trajectory of the projectile 116 such that the mixed-reality projectile-tracking simulator 100 may provide accurate simulations of a traditional projectile 116. In one embodiment, projectile-tracking sensors 310 located within the projectile 116 are distributed so as to mitigate any impact on the center of mass of the projectile 116.

Figure 3D:
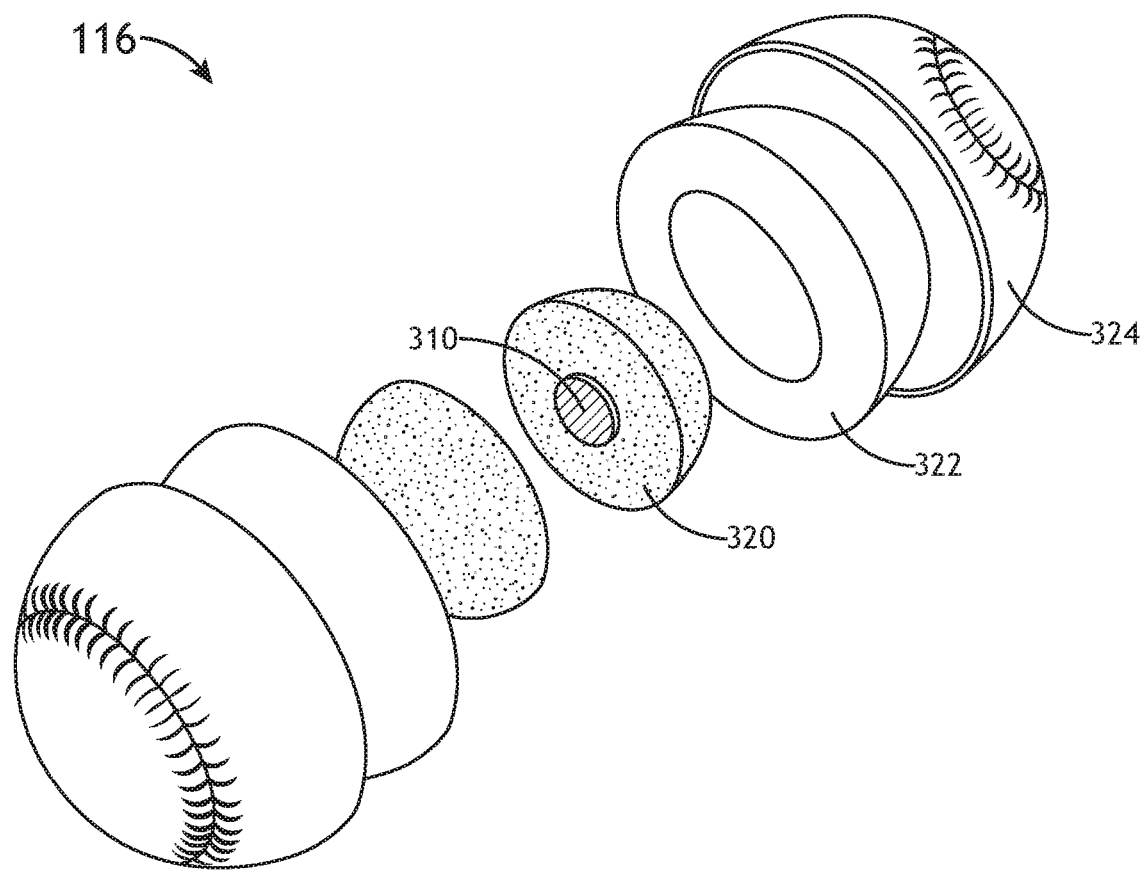
FIG. 3D is an exploded view of projectile-tracking sensors integrated within the center of a baseball projectile, in accordance with one or more embodiments of the present disclosure.
Figure 3E:
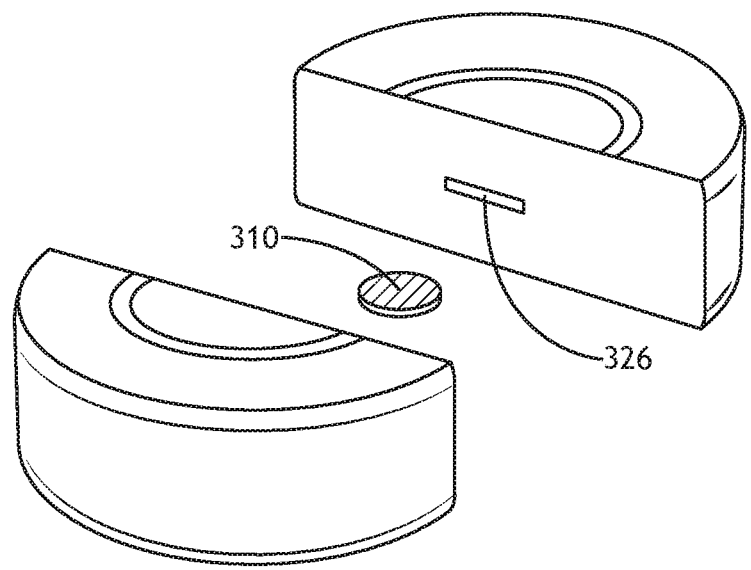
FIG. 3E is an exploded view of projectile-tracking sensors integrated within the center of a hockey puck projectile, in accordance with one or more embodiments of the present disclosure.
Figure 3F:
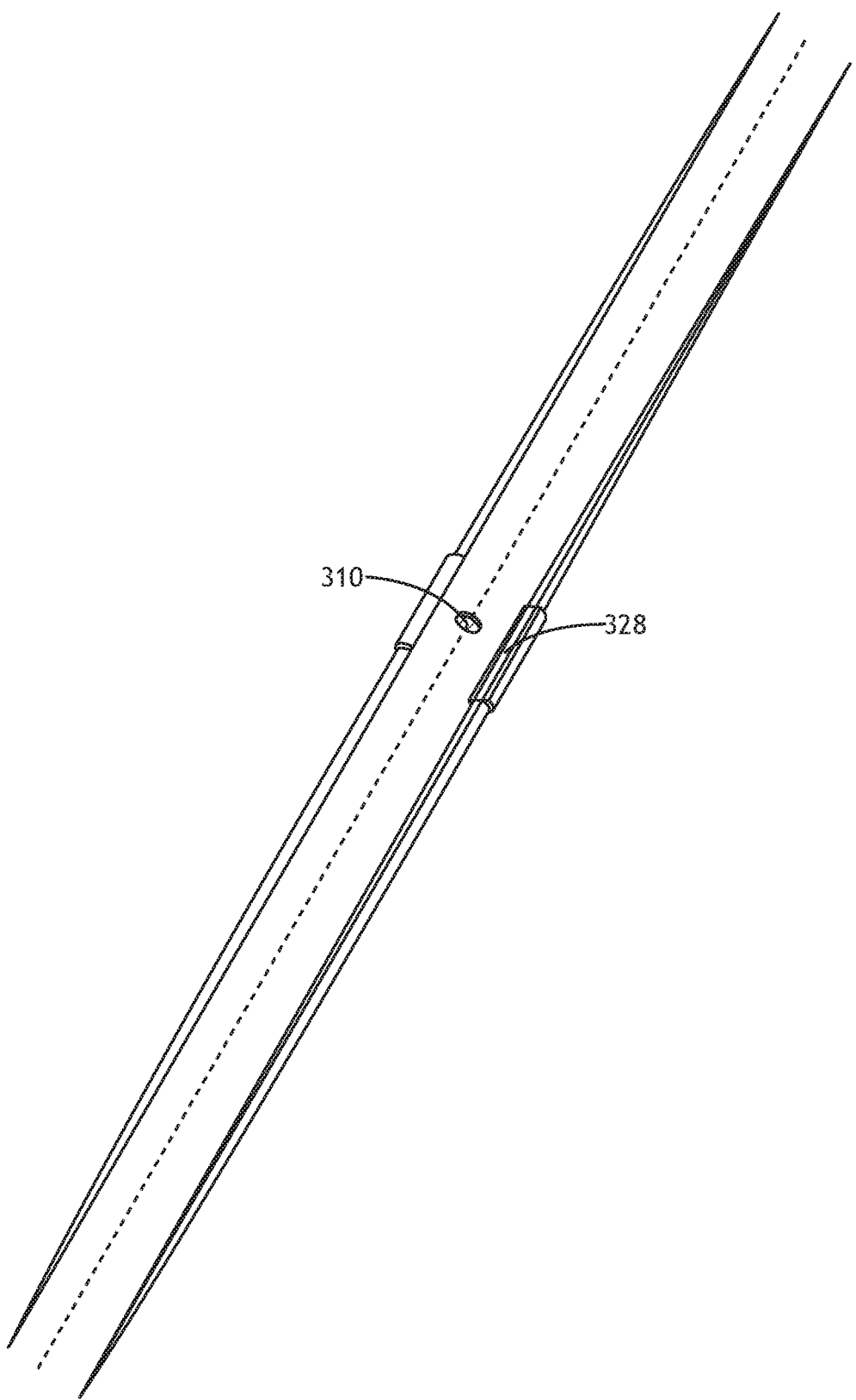
FIG. 3F is an exploded view of projectile-tracking sensors integrated within the center of a javelin projectile, in accordance with one or more embodiments of the present disclosure.

Referring now to FIGS. 3D through 3F, projectile-tracking sensors 310 may be located around the center of a projectile 116. In this regard, placement of projectile-tracking sensors 310 near the ends 336 may mitigate the displacement of the projectile-tracking sensors 310 during impact, which may facilitate measurements of projectile-tracking data such as, but not limited to, launch velocity, acceleration, or rotation during the impact.

FIG. 3D is an exploded view of projectile-tracking sensors 310 integrated within the center of a baseball projectile 116, in accordance with one or more embodiments of the present disclosure. For example, a baseball projectile 116 may be formed from a central portion 320 (e.g., a cork, or the like), one or more intermediate layers 322 (e.g., winding layers, or the like), and an outer layer 324. In one embodiment, one or more projectile-tracking sensors 310 may be located within the central portion 320.

FIG. 3E is an exploded view of projectile-tracking sensors 310 integrated within the center of a hockey puck projectile 116, in accordance with one or more embodiments of the present disclosure. For example, a hockey puck projectile 116 may be formed from a solid material (e.g., rubber, or the like). In one embodiment, one or more projectile-tracking sensors 310 may be located within an interior compartment 326 shaped to fit the projectile-tracking sensors 310.

FIG. 3F is an exploded view of projectile-tracking sensors 310 integrated within the center of a javelin projectile 116, in accordance with one or more embodiments of the present disclosure. For example, a javelin projectile 116 may be formed from a solid material (e.g., metal, wood, plastic, or the like). In one embodiment, one or more projectile-tracking sensors 310 may be located within an interior compartment 328 shaped to fit the projectile-tracking sensors 310.

Figure 3G:
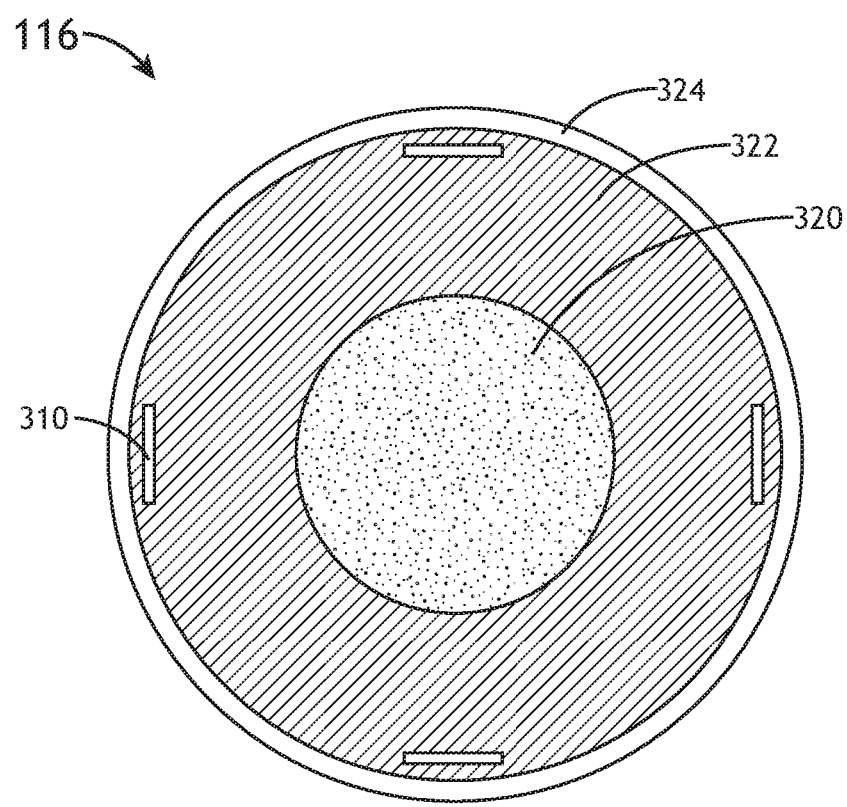
FIG. 3G is an exploded view of projectile-tracking sensors distributed throughout a baseball projectile, in accordance with one or more embodiments of the present disclosure.
Figure 3H:
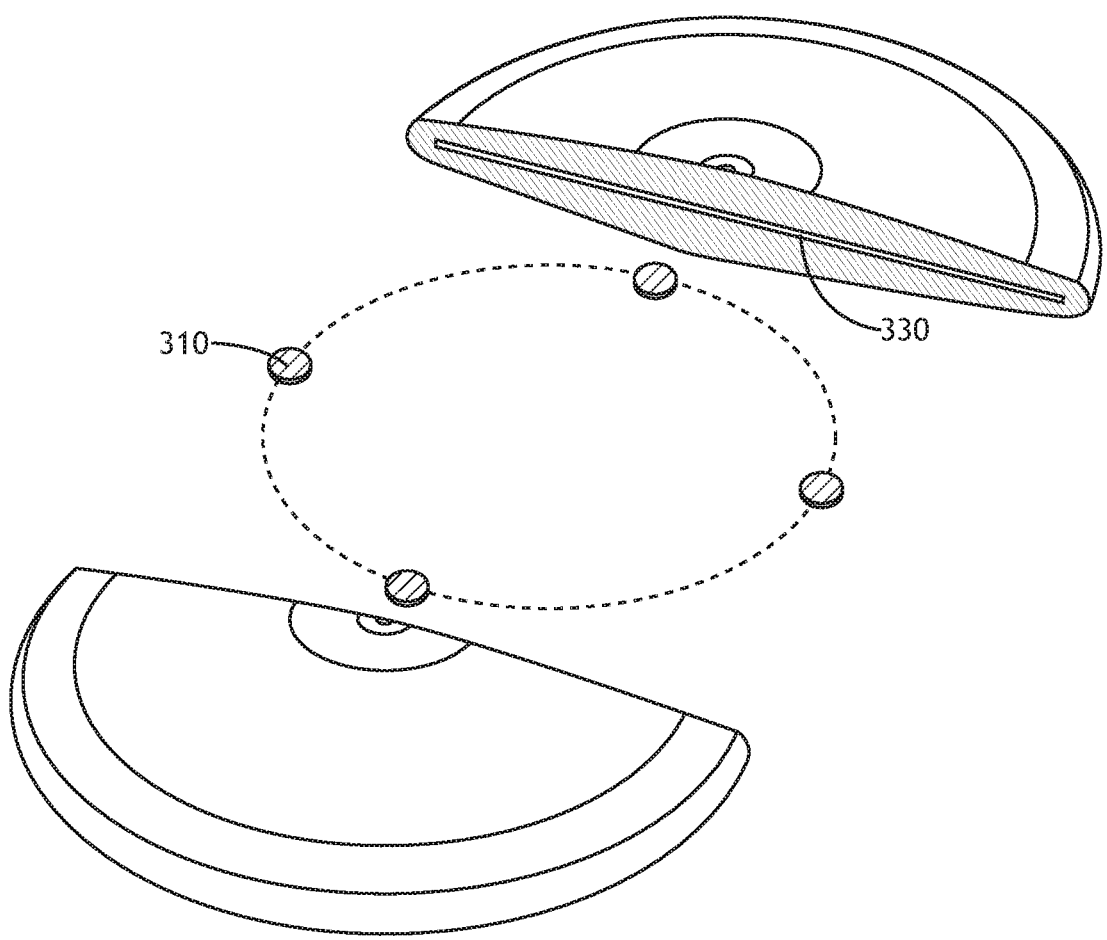
FIG. 3H is an exploded view of projectile-tracking sensors distributed throughout a discus projectile, in accordance with one or more embodiments of the present disclosure.
Figure 31:
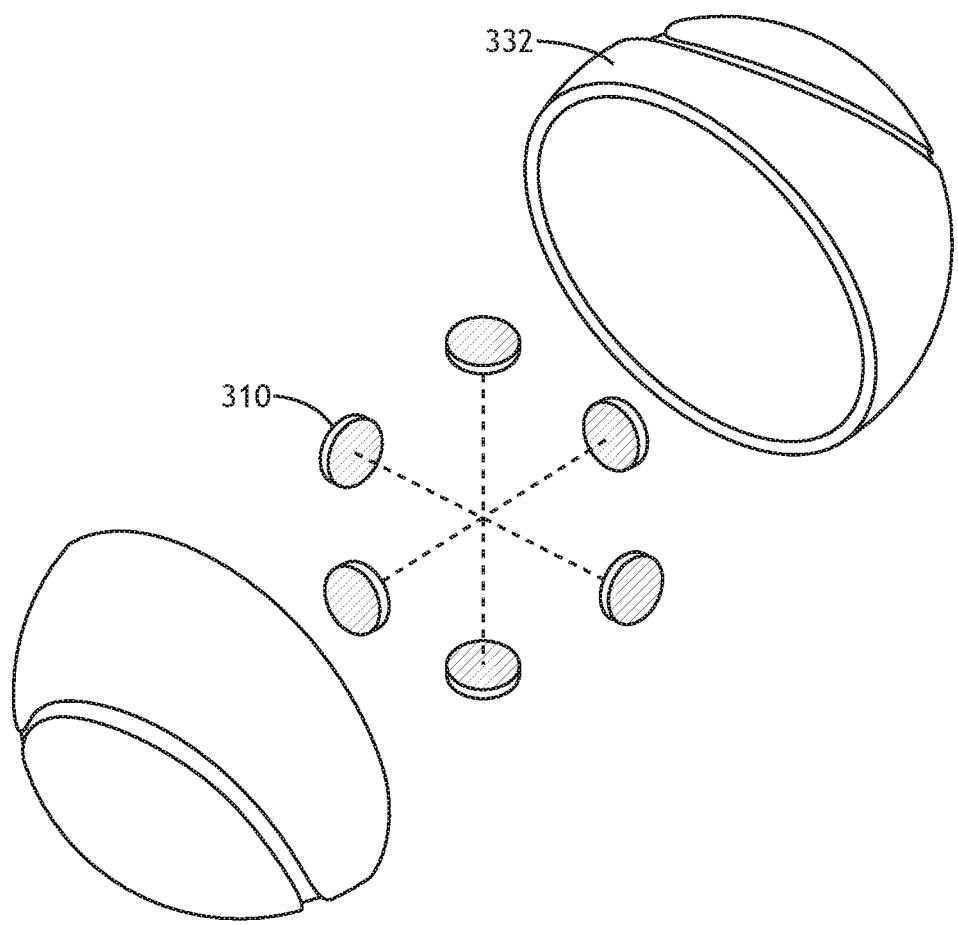

Referring now to FIGS. 3G through 3I, one or more projectile-tracking sensors 310 may be, distributed throughout the projectile 116. In this regard, placement of projectile-tracking sensors 310 may facilitate measurements of projectile-tracking data (e.g., rotation around multiple axes, or the like) or a point of impact.

FIG. 3G is an exploded view of projectile-tracking sensors 310 distributed throughout a baseball projectile 116, in accordance with one or more embodiments of the present disclosure. In one embodiment, one or more projectile-tracking sensors 310 may be integrated within the intermediate layers 322 of the baseball projectile 116.

FIG. 3H is an exploded view of projectile-tracking sensors 310 distributed throughout a discus projectile 116, in accordance with one or more embodiments of the present disclosure. For example, a discus projectile 116 may be formed as a solid material (e.g., metal, plastic, or the like). In one embodiment, one or more projectile-tracking sensors 310 may be located within interior compartments 330 shaped to fit the projectile-tracking sensors 310 distributed throughout the discus projectile 116. In one instance, as illustrated in FIG. 3D, projectile-tracking sensors 310 may be distributed in a ring along an anticipated plane of rotation.

FIG. 3I is an exploded view of projectile-tracking sensors 310 integrated within the center of a tennis ball projectile 116, in accordance with one or more embodiments of the present disclosure. For example, a tennis ball projectile 116 may be formed from a shell material 332 with a hollow core. In one embodiment, one or more projectile-tracking sensors 310 may be attached to interior surfaces of the shell material 332.

Figure 3J:
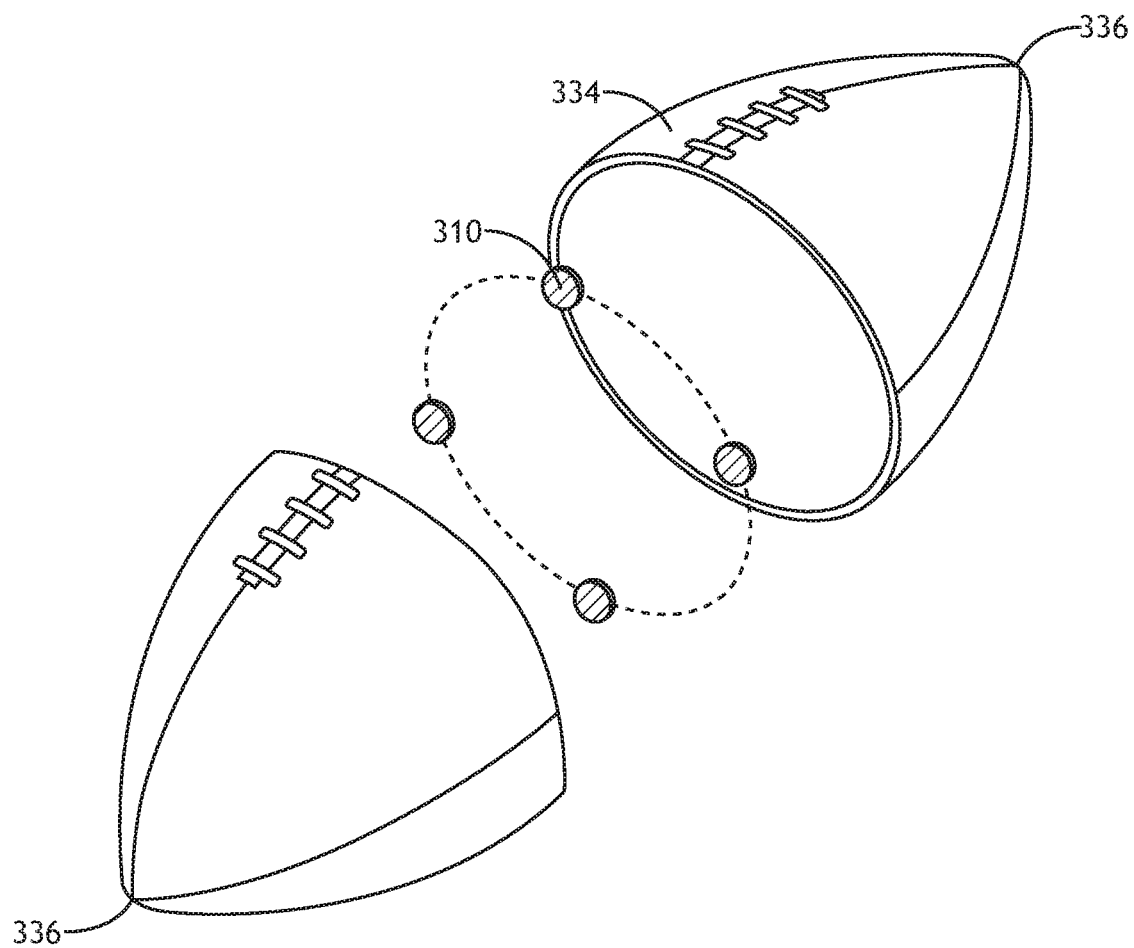
FIG. 3J is an exploded view of projectile-tracking sensors integrated within the center of a football projectile, in accordance with one or more embodiments of the present disclosure.

FIG. 3J is an exploded view of projectile-tracking sensors 310 integrated within the center of a football projectile 116, in accordance with one or more embodiments of the present disclosure. For example, a football projectile 116 may be formed from an oblong shell material 334 with a hollow core. In one embodiment, one or more projectile-tracking sensors 310 may be attached to interior surfaces of the shell material 332. Further, the locations of the projectile-tracking sensors 310 may be selected based on the anticipated points of impact. For example, as illustrated in FIG. 3J, the projectile-tracking sensors 310 may be distributed evenly around a circumference of a football projectile 116. In this regard, the projectile-tracking sensors 310 may provide sensitive rotational measurements and wobble detection as the football projectile 116 is thrown. By way of another example, though not shown, one or more projectile-tracking sensors 310 may be located near one or both of the ends 336 of a football projectile 116. In this regard, the projectile-tracking sensors 310 may provide sensitive measurements of end-over-end rotation.

It is to be understood, however, that the illustrations in FIGS. 3D through 3J are provided solely for illustrative purposes and should not be interpreted as limiting. The projectile-tracking sensors 310 may be placed at any number of selected locations throughout any type of projectile 116 to facilitate the collection of projectile-tracking data.

In one embodiment, the projectile-tracking sensors 310 include, but are not limited to, an inertial measurement unit (IMU) including any combination of accelerometers, orientation sensors, electromagnetic sensors, or magnetometers to measure and generate data associated with the acceleration, orientation, and/or rotation of the projectile 116. By way of another example, the projectile-tracking sensors 310 may include an altimeter to determine the height of the projectile 116 with respect to the ground. By way of another example, the projectile-tracking sensors 310 may include a global positioning system (GPS) device configured to determine the position of the projectile 116 in three-dimensional coordinates.

In another embodiment, the system includes a user-tracking sub-system 106 including one or more sensors to monitor the motion of the user 114 and/or user equipment (e.g., a bat, a racquet, a stick, or the like) during an action (e.g., a throw or a hit). It is recognized herein that the motion of the user including the body position and body movement critically impact the mechanics of the action and thus the resulting trajectory of the projectile 116. Accordingly, the user-tracking sub-system 106 may monitor and generate user motion data associated with one or more aspects of the body of the user 114 before, during, or after an action. This user motion data during a launch may then be correlated with the trajectory of the projectile 116 to provide a comprehensive tracking dataset associated with each user action.

The user-tracking sub-system 106 may be provided as one or more stand-alone devices (e.g., stand-alone device 306, or the like) or may be at least partially integrated with other system components such as the projectile-tracking sub-system 104 or the near-eye display 102. For example, as illustrated in FIG. 1B, the user-tracking sub-system 106 may include the camera 302 described previously herein associated with the projectile-tracking sub-system 104. In this regard, the user-tracking sub-system 106 may track the motion of the user and generate data such as, but not limited to, arm position, leg position, shoulder position, arm speed, trajectory information of a bat 120, racquet 122, stick 124, or the like. By way of another example, the user-tracking sub-system 106 may include one or more wearable sensors worn by the user 114 and/or integrated or attached to user equipment (e.g., the bat 120, the racquet 122, the stick 124, or the like). For instance, the user-tracking sub-system 106 may include the near-eye display 102 to generate positional information of the user 114 during an action. In another instance, the user-tracking sub-system 106 may include one or more sensor pads (not shown) embedded within shoes worn by the user 114 (e.g., shoes 126 in FIGS. 1B through 1F). The sensor pads may include any type of sensor suitable for tracking user motion such as, but not limited to, a pressure sensor, an inertial measurement unit (IMU), a pedometer, or the like. In this regard, the user-tracking sub-system 106 may track user data such as, but not limited to, a number of steps, a gait of a user both naturally and during an action, foot speed, foot trajectory, or the like. In another instance, the user-tracking sub-system 106 may include wearable sensors to be distributed across the body of the user 114. In this regard, the user-tracking sub-system 106 may gather user movement data of various parts of the body such as, but not limited to, hip movement, arm motion, or body posture during an action.

The hitting equipment tracking sub-system 107 may be provided as one or more stand-alone devices (e.g., stand-alone device 306, or the like) or may be at least partially integrated with other system components such as the projectile-tracking sub-system 104 or the near-eye display 102. For example, the hitting equipment tracking sub-system 107 may include the camera 302 described previously herein associated with the projectile-tracking sub-system 104 and/or the user-tracking sub-system 106. In this regard, the hitting equipment tracking sub-system 107 may track the motion of the hitting equipment and generate data such as, but not limited to, position, speed, or trajectory data, of a bat 120, racquet 122, stick 124, or the like. By way of another example, the hitting equipment tracking sub-system 107 may include one or more sensors integrated or attached to user equipment (e.g., the bat 120, the racquet 122, the stick 124, or the like). For instance, the hitting equipment tracking sub-system 107 may include, but is not limited to, an inertial measurement unit (e.g., accelerometer, gyroscopes, magnetometer, and the like) attached to or built into the equipment.

In another embodiment, the controller 108 receives tracking data from the projectile-tracking sub-system 104 over the launch window and determines a predicted trajectory of the projectile 116 after the launch window. The controller 108 may determine the predicted trajectory of the projectile 116 using any technique known in the art. For example, the controller 108 may include a physics engine suitable for generating a predicted trajectory based in input data from the projectile-tracking sub-system 104 (including ball data and weather data) and/or the user-tracking sub-system 106 as initial conditions. Further, the controller 108 may utilize a virtual environment selected by the user 114 or measurements of the physical environment to determine the landing position of the projectile 116.

In one embodiment, the mixed-reality projectile-tracking simulator 100 may save (e.g., in the memory medium 112) tracking data from the user-tracking sub-system 106 and/or the projectile-tracking sub-system 104 for each action or for any user-selected actions. Further, the tracking data may be analyzed by the user 114 and/or by the controller 108 to correlate user motion data from the user-tracking sub-system 106 with projectile-tracking data from the projectile-tracking sub-system 104 and/or predicted trajectory data from the controller 108.

Figure 4:
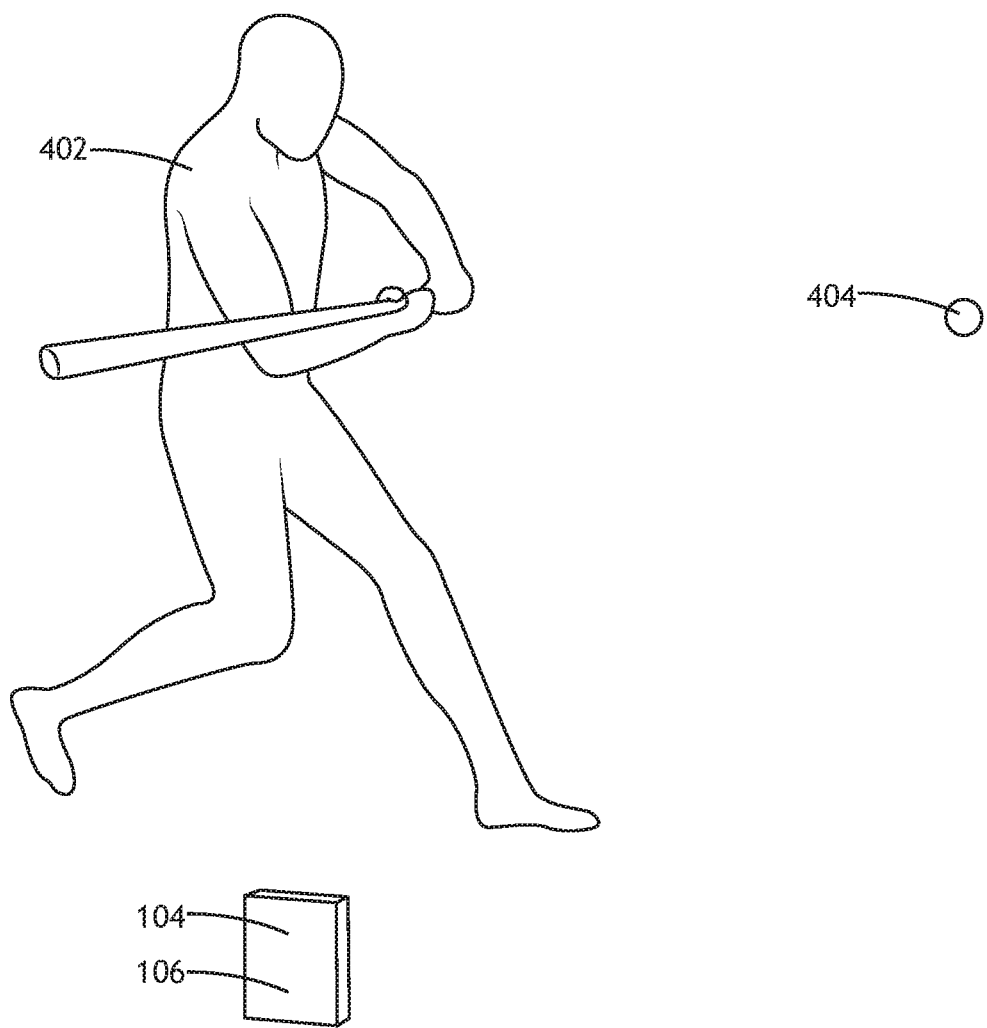
FIG. 4 is a perspective view of an avatar representing a user during a batting motion, in accordance with one or more embodiments of the present disclosure.

Further, the mixed-reality projectile-tracking simulator 100 may present the tracking data to the user 114 as mixed-reality objects through the near-eye display 102. FIG. 4 is a perspective view of an avatar 402 representing a user 114 during a batting motion, in accordance with one or more embodiments of the present disclosure. In one embodiment, the near-eye display 102 may display an avatar 402 performing the motion of the user 114 as well as the predicted trajectory of a virtual projectile 404 as virtual objects. Further, the near-eye display 102 may display relevant tracking data (e.g., launch angle, launch velocity, rotation, impact point on the ball, arm speed, or the like). In this regard, the user 114 may move around the avatar and view the motions and relevant data associated from multiple viewpoints.

In another embodiment, the mixed-reality projectile-tracking simulator 100 may learn the natural motions and techniques of the user 114 over time through continued use of the mixed-reality projectile-tracking simulator 100 and may correlate the impact of specific body movements to the resulting trajectory of the projectile 116. Accordingly, the mixed-reality projectile-tracking simulator 100 may identify specific aspects of user motion that substantially impact on the outcome and provide user-customized coaching data to assist the user in modifying his or her technique. For example, the near-eye display 102 may sequentially or simultaneously display avatars 402 illustrating past actions with different outcomes to provide a side-by-side comparison of the user motion and corresponding trajectories. By way of another example, the near-eye display 102 may display an avatar 402 of the user going through a suggested motion as a guide.

Referring now to FIGS. 5 through 8B, the operation of the mixed-reality projectile-tracking simulator 100 by the user 114 is described in accordance with one or more embodiments of the present disclosure.

Figure 5:
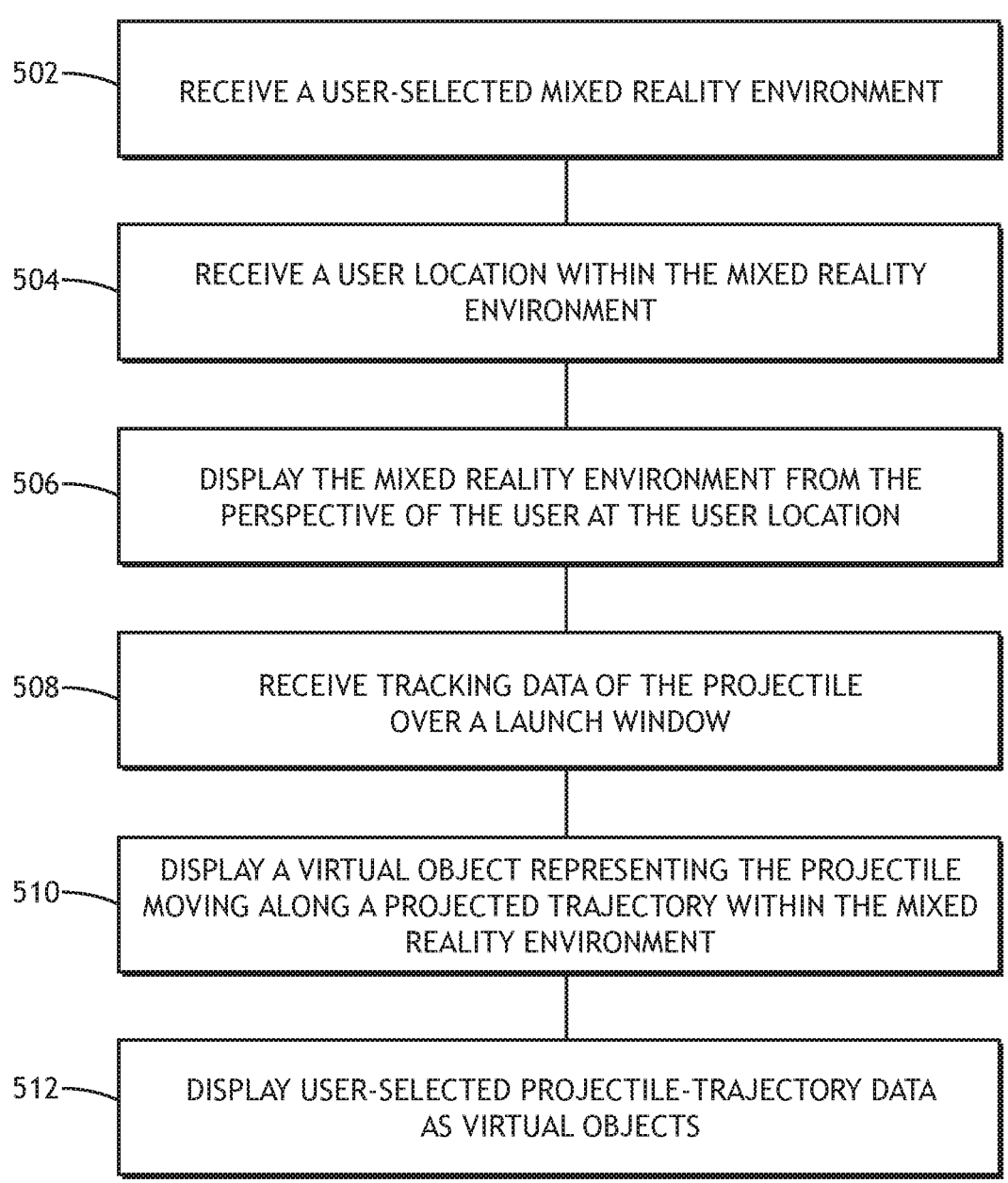
FIG. 5 is a flow diagram illustrating steps performed in a method for mixed-reality sport simulation, in accordance with one or more embodiments of the present disclosure.

FIG. 5 is a flow diagram illustrating steps performed in a method 500 for mixed-reality sport simulation, in accordance with one or more embodiments of the present disclosure. Applicant notes that the embodiments and enabling technologies described previously herein in the context of mixed-reality projectile-tracking simulator 100 should be interpreted to extend to method 500. It is further noted, however, that the method 500 is not limited to the architecture of the mixed-reality projectile-tracking simulator 100.

In one embodiment, the method 500 includes a step 502 of receiving a user-selected mixed-reality environment. For example, as described previously herein, a user 114 may select any desired combination of virtual elements forming a virtual environment to be displayed on the near-eye display 102. Further, objects in the virtual environment may be displayed based on the head orientation and/or the gaze direction of the user.

For example, a user may select any combination of virtual objects to be displayed along with physical objects visible through the near-eye display 102. In this regard, the mixed-reality environment may include augmented reality objects. By way of another example, the user 114 may select a combination of opaque virtual objects that may represent an immersive virtual scene that occupies at least a portion of the field of view of the user and completely blocks physical objects from view.

In one embodiment, the virtual environment includes virtual objects representing a selected location such as, but not limited to, an open athletic field, a generic stadium, training facilities, or a representation of an actual stadium (e.g., a home stadium of a favorite team of the user, or the like).

In another embodiment, the method 500 includes a step 504 of receiving a user location within the mixed-reality environment. In another embodiment, the method 500 includes a step 506 of displaying the mixed-reality environment from the perspective of the user at the user location.

Figure 6A:
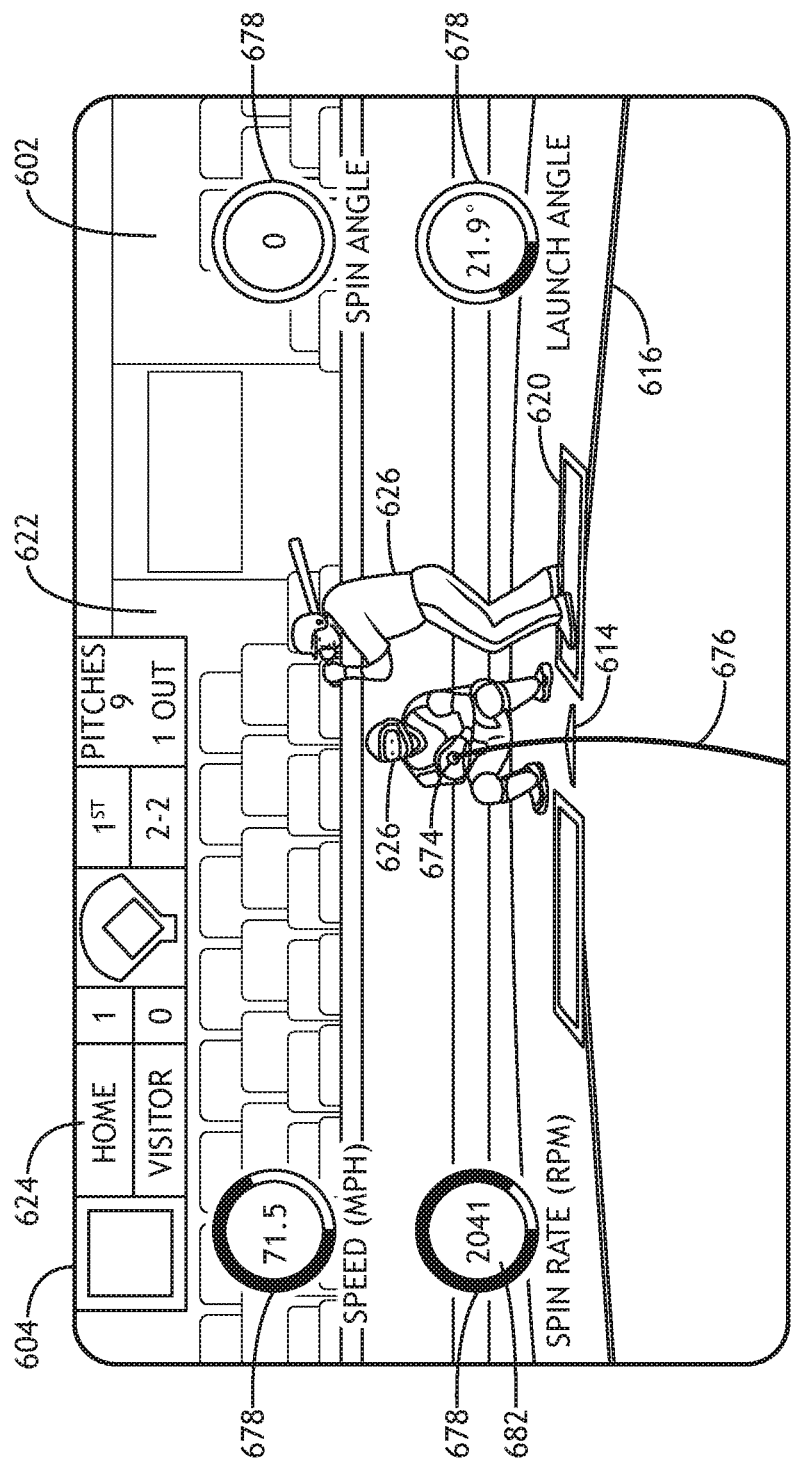
FIG. 6A is a conceptual view of a mixed-reality environment including a baseball field from a field of view of a pitcher when looking in a horizontal direction, in accordance with one or more embodiments of the present disclosure.
Figure 6B:
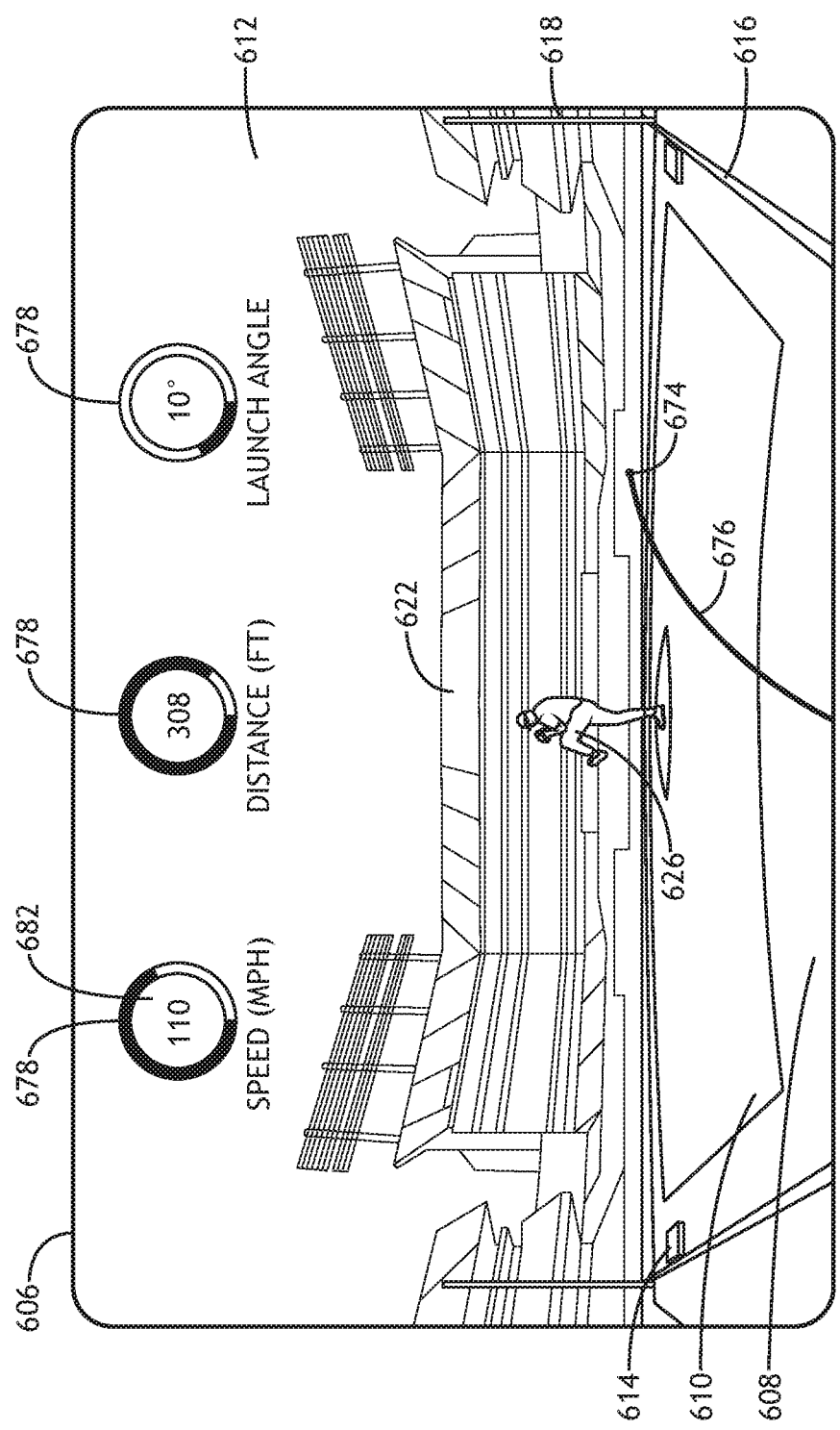
FIG. 6B is a conceptual view of a the mixed-reality environment of the baseball field from a field of view of a batter when looking in a horizontal direction, in accordance with one or more embodiments of the present disclosure.

FIG. 6A is a conceptual view of a mixed-reality environment 602 including a baseball field from a field of view 604 of a pitcher when looking in a horizontal direction, in accordance with one or more embodiments of the present disclosure. FIG. 6B is a conceptual view of a the mixed-reality environment 602 of the baseball field from a field of view 606 of a batter when looking in a horizontal direction, in accordance with one or more embodiments of the present disclosure. In one embodiment, the mixed-reality environment 602 includes a combination of physical (e.g., real-world) objects and virtual objects associated with the baseball field. For example, the mixed-reality environment 602 may include a combination of real and virtual objects such as dirt 608, turf 610, the sky 612, bases 614, base lines 616, foul posts 618, batter's boxes 620, portions of a stadium 622, a scoreboard 624, or the like. By way of another example, the mixed-reality environment 602 may include additional players 626 that may be real or virtual. In this regard, a user may customize a desired virtual experience.

Figure 6C:
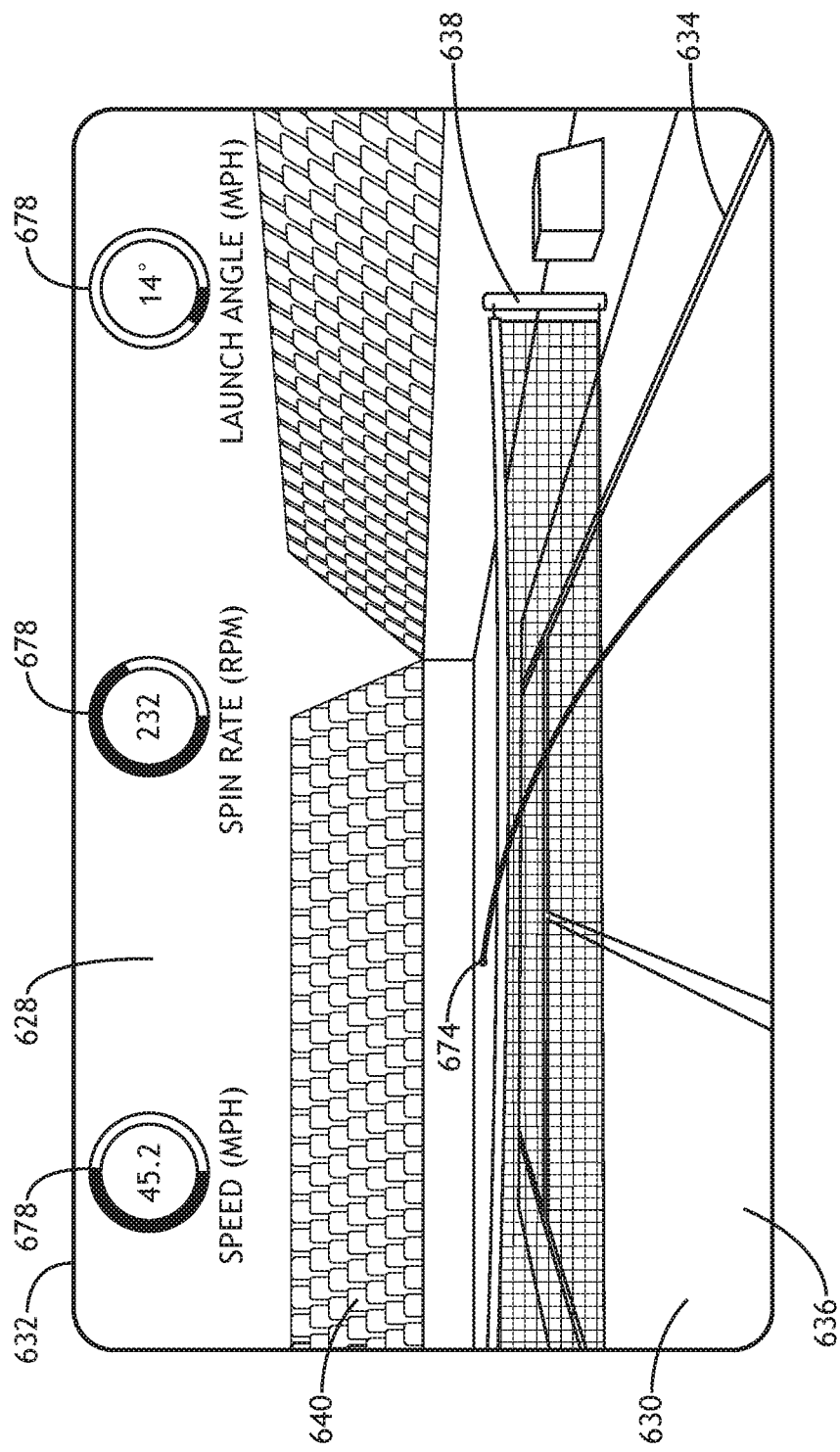
FIG. 6C is a conceptual view of a mixed-reality environment including a tennis court from a field of view of a player, in accordance with one or more embodiments of the present disclosure. In one embodiment, the mixed-reality environment includes a combination of real and virtual objects such as field markings, a playing surface 636, a net 638, and a portion of a stadium.

FIG. 6C is a conceptual view of a mixed-reality environment 628 including a tennis court 630 from a field of view 632 of a player, in accordance with one or more embodiments of the present disclosure. In one embodiment, the mixed-reality environment 628 includes a combination of real and virtual objects such as field markings 634, a playing surface 636, a net 638, and a portion of a stadium 640.

Figure 6D:
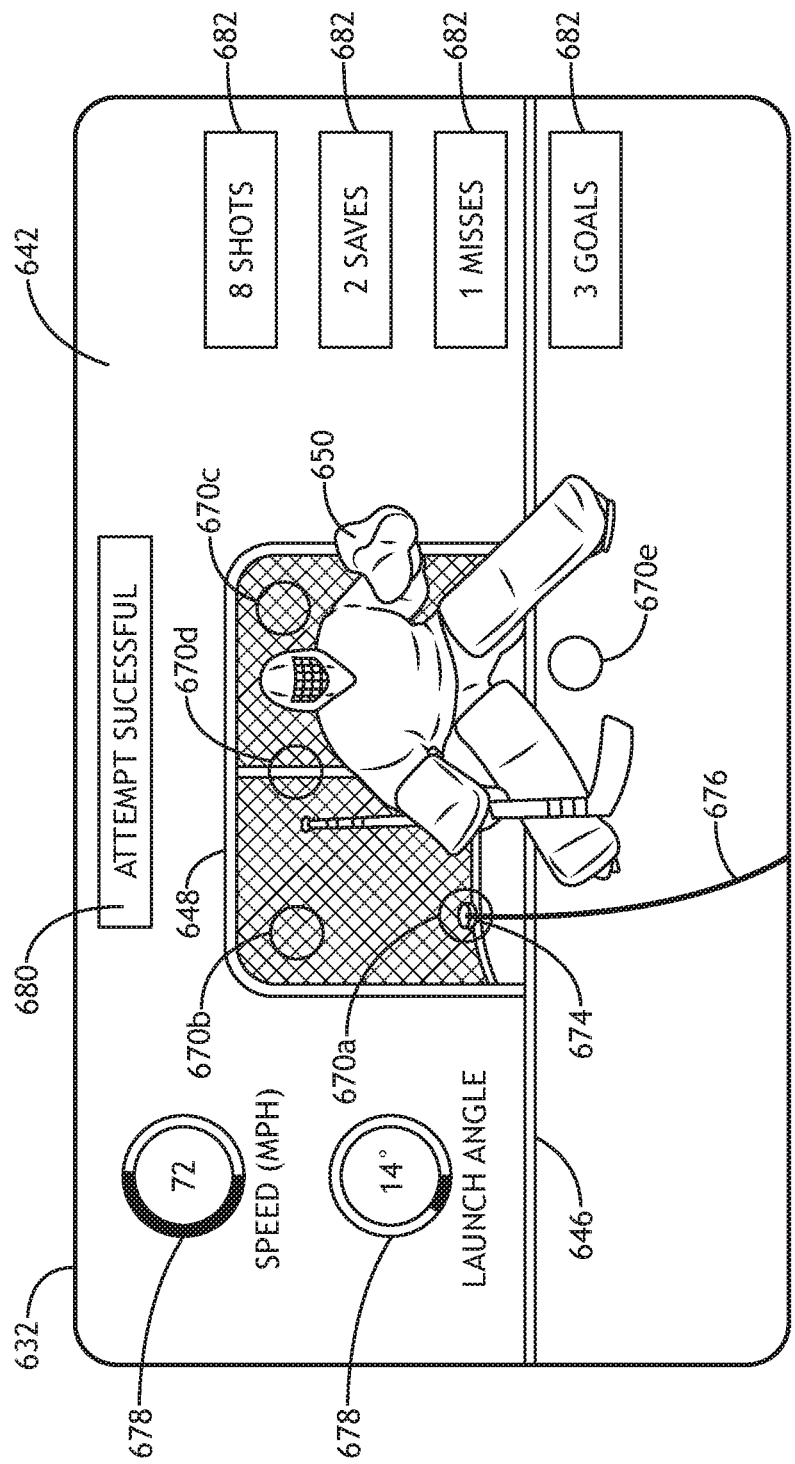
FIG. 6D is a conceptual view of a mixed-reality environment including an ice hockey rink from a field of view of a player, in accordance with one or more embodiments of the present disclosure.

FIG. 6D is a conceptual view of a mixed-reality environment 642 including an ice hockey rink from a field of view 644 of a player, in accordance with one or more embodiments of the present disclosure. In one embodiment, the mixed-reality environment 642 includes a combination of real and virtual objects such as field markings 646, a net 648, and a goalie 650.

It is recognized herein that the illustration of the mixed reality environments in FIGS. 6A through 6D and the associated elements are provided solely for illustrative purposes and should not be interpreted as limiting the present disclosure. Rather, the mixed-reality projectile-tracking simulator 100 may display any combination of components of any selected athletic field for any selected sport such as, but not limited to, a softball field, a tennis court, an ice rink, a football field, or the like. Further, the mixed-reality projectile-tracking simulator 100 may display views of both real and virtual objects from any selected position on the field. In some embodiments, a user may physically move and the mixed-reality projectile-tracking simulator 100 will modify the sizes, shapes, and/or orientations of the mixed reality environments accordingly.

As described previously herein, the mixed-reality projectile-tracking simulator 100 may provide a mixed-reality environment including any combination of real and virtual objects. In another embodiment, the mixed-reality projectile-tracking simulator 100 may monitor and map physical objects such that the virtual objects may be displayed in a coordinate system that matches the physical locations of the physical objects in the real-world view of the user 114. Accordingly, the mixed-reality projectile-tracking simulator 100 (e.g., via the near-eye display 102) may detect the presence of physical objects and may display virtual objects of missing physical objects according to the perspective and location of the user in both the real world and the virtual environment. Taking a non-limiting example of a baseball field illustrated in FIGS. 6A and 6B in which the dirt 608, turf 610, and the bases 614 are real (e.g., the user is on an un-marked baseball practice field), the mixed-reality projectile-tracking simulator 100 may detect and map the locations of the real objects and display virtual objects corresponding to the base lines 616, batter's boxes 620, foul posts 618, scoreboard 624, and/or stadium 622.

The mixed-reality projectile-tracking simulator 100 may detect and map the locations of physical objects using any technique known in the art. For example, the mixed-reality projectile-tracking simulator 100 may detect the locations of physical objects using any combination of components of the mixed-reality projectile-tracking simulator 100 such as, but not limited to, the camera 216 on the near-eye display 102, the camera 216 on a projectile-tracking sub-system 104, or any combination of sensors (e.g., range-finding sensors, or the like) located in the near-eye display 102, the projectile-tracking sub-system 104, or as stand-alone devices. By way of another example, the mixed-reality projectile-tracking simulator 100 may accept or prompt for user-assisted locating of physical objects. For instance, the user 114 may engage the user interface 228 while standing at selected boundaries (e.g., field markers, bases, or the like). The mixed-reality projectile-tracking simulator 100 may then generate a virtual coordinate system that corresponds to the physical world such that virtual objects may be properly located alongside real-world objects in a mixed-reality environment.

In another embodiment, a user may select specific virtual objects to supplement the physical objects in the field of view of the user 114. For example, a user on an open grass field may selectively display field markings (e.g., base lines 616, batter's boxes 620, or the like) and bases 614. Accordingly, the turf 610 (e.g., grass) may be a physical object, whereas the field markings and bases 614 are displayed as virtual objects. By way of another example, a user on a practice field with field markings, but no bases 614 may selectively display only bases 614 in a virtual environment. Accordingly, the turf 610 and field markings may be visible as physical objects, whereas the bases 614 may be displayed as virtual objects.

By way of one example, the mixed-reality projectile-tracking simulator 100 may identify (e.g., with the camera 216, or the like) that the user 114 is on a practice field with marked field markings and no foul posts 618. Accordingly, the near-eye display 102 may display virtual objects representing foul posts 618 at the end of the field as determined by physical field markings. Further, the size and orientation of the virtual foul posts 618 may be continually adjusted as the user 114 moves around the virtual environment, looks in different directions, or the like based on data provided by the near-eye display 102.

Further, it is recognized that some training facilities may have a variety of markers and/or visual cues on the field or walls for athletes. Accordingly, the mixed-reality projectile-tracking simulator 100 may identify the markers and/or visual cues to guide the placement of virtual objects in a mixed-reality environment.

In another embodiment, a user may select immersive virtual scenes that obstruct the real-world view of the user. For example, a user (e.g., in a closed room) may select an immersive virtual environment in which a field, field markings, goal posts, and surrounding structures (e.g., lights, seating, or the like) are all virtual.

In another embodiment, a virtual environment may be bounded to a selected set of view vectors (e.g., gaze directions, or the like) that represent lines of sight within a field of view of the user. For example, it may be desirable for the user to accurately view the projectile 116 in order to properly execute an action. Accordingly, the near-eye display 102 may be configured to provide an unobstructed view of the real world when the user is looking down or at the projectile 116 and display the virtual environment as the user looks upward (e.g., to aim within a mixed-reality environment and/or as the user follows through after a motion). In this regard, the near-eye display 102 may determine a set of view vectors for a given field of view of the user and selectively display virtual objects (e.g., associated with the virtual environment and/or projectile-trajectory data) only for view vectors above a selected angle. For instance, the selected angle may be, but is not required to be, defined as a selected pitch angle of the head of the user with respect to the horizon.

In another embodiment, a virtual environment may be selectively displayed based on whether or not a projectile 116 has been launched (e.g., thrown or hit). For example, the near-eye display 102 may provide an unobstructed view of the real-world prior to a launch and display one or more virtual objects (e.g., associated with the virtual environment and/or projectile-tracking data) after a launch.

FIG. 6E is a conceptual view of a field of view 652 of an unobstructed view of a pitcher of FIG. 6A when looking in a downward direction (e.g., below a selected pitch angle), in accordance with one or more embodiments of the present disclosure. For example, the user may see a mound 654, and a portion of the user's feet and legs.

Figure 6F:
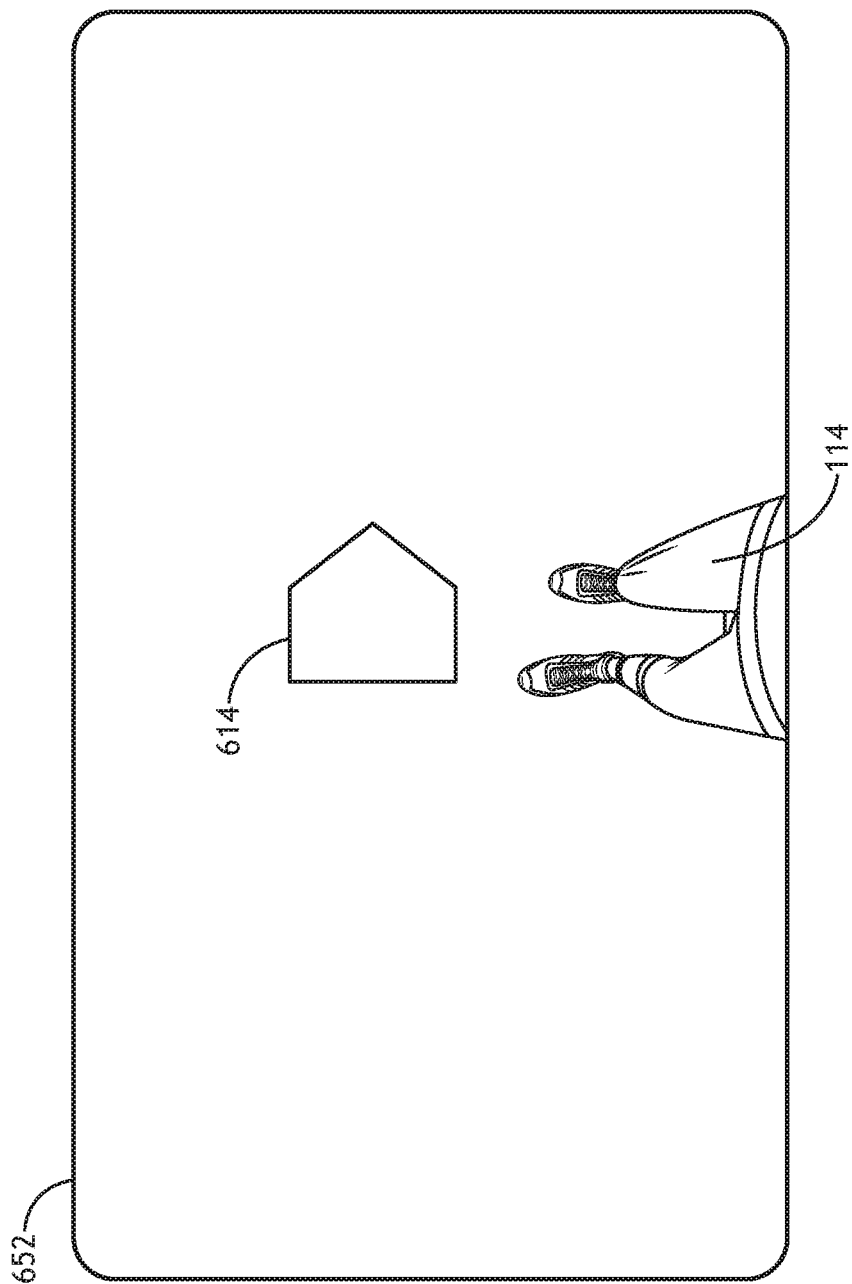
FIG. 6F is a conceptual view of a field of view of an unobstructed view of a batter of FIG. 6A when looking in a downward direction, in accordance with one or more embodiments of the present disclosure.

FIG. 6F is a conceptual view of a field of view 656 of an unobstructed view of a batter of FIG. 6A when looking in a downward direction (e.g., below a selected pitch angle), in accordance with one or more embodiments of the present disclosure. For example, the user may see the home base 614, and a portion of the user's feet and legs.

Figure 6G:
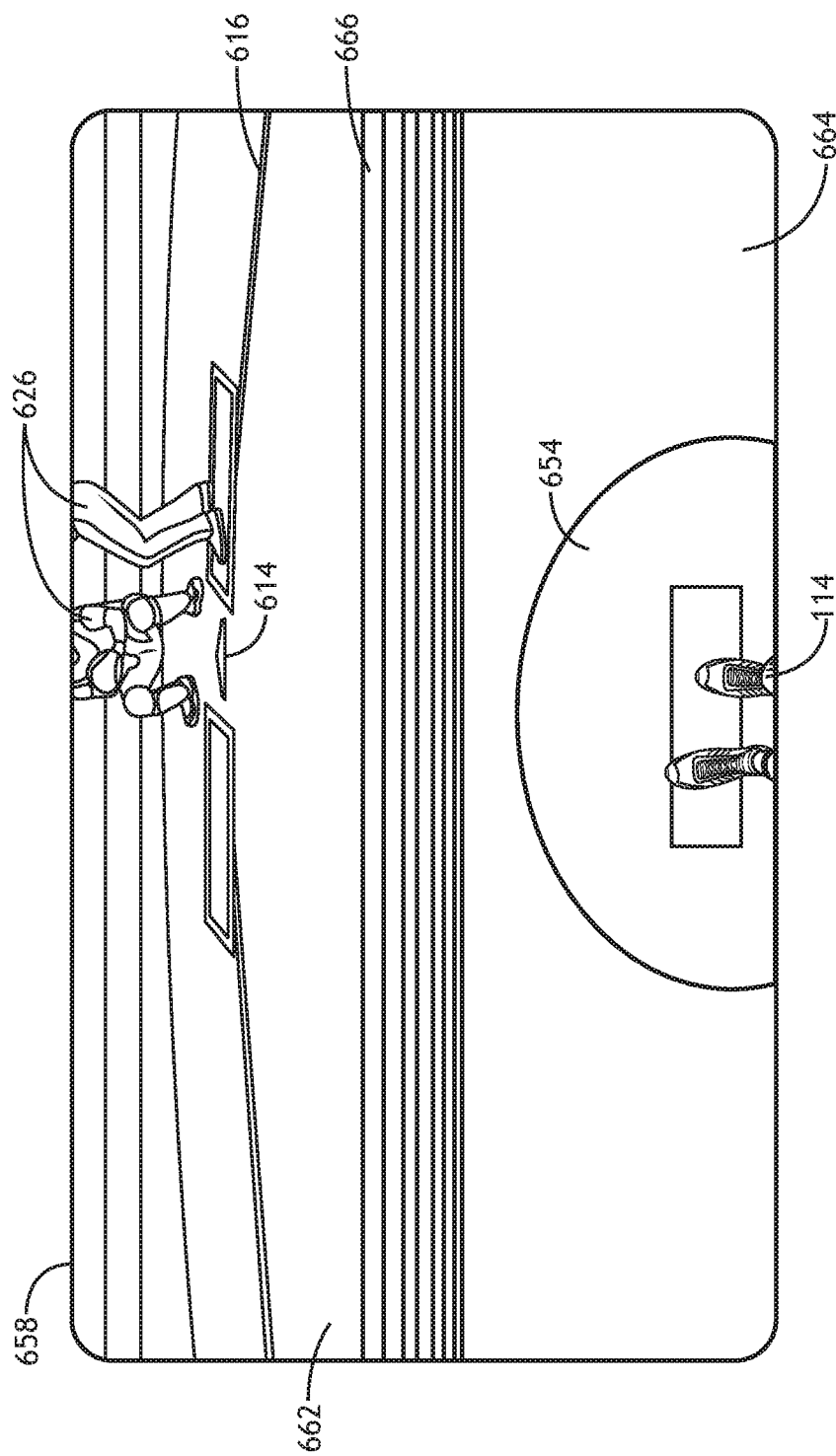
FIG. 6G is a conceptual view of a field of view of a pitcher transitioning between a virtual environment of FIG. 6A and an unobstructed view of FIG. 6E, in accordance with one or more embodiments of the present disclosure.
Figure 6H:
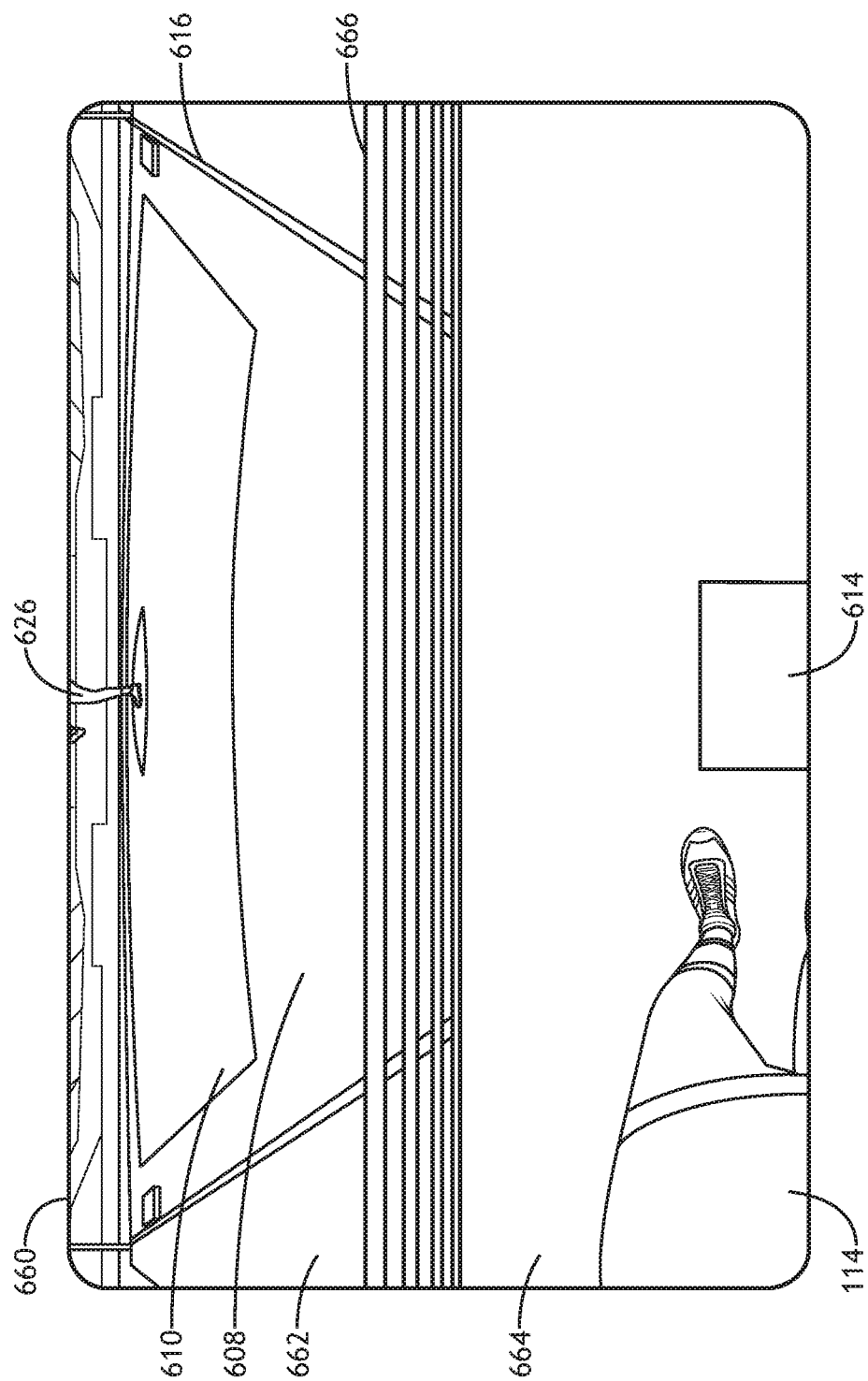
FIG. 6H is a conceptual view of a field of view of a batter transitioning between a virtual environment of FIG. 6B and an unobstructed view of FIG. 6F, in accordance with one or more embodiments of the present disclosure.
Figure 61:
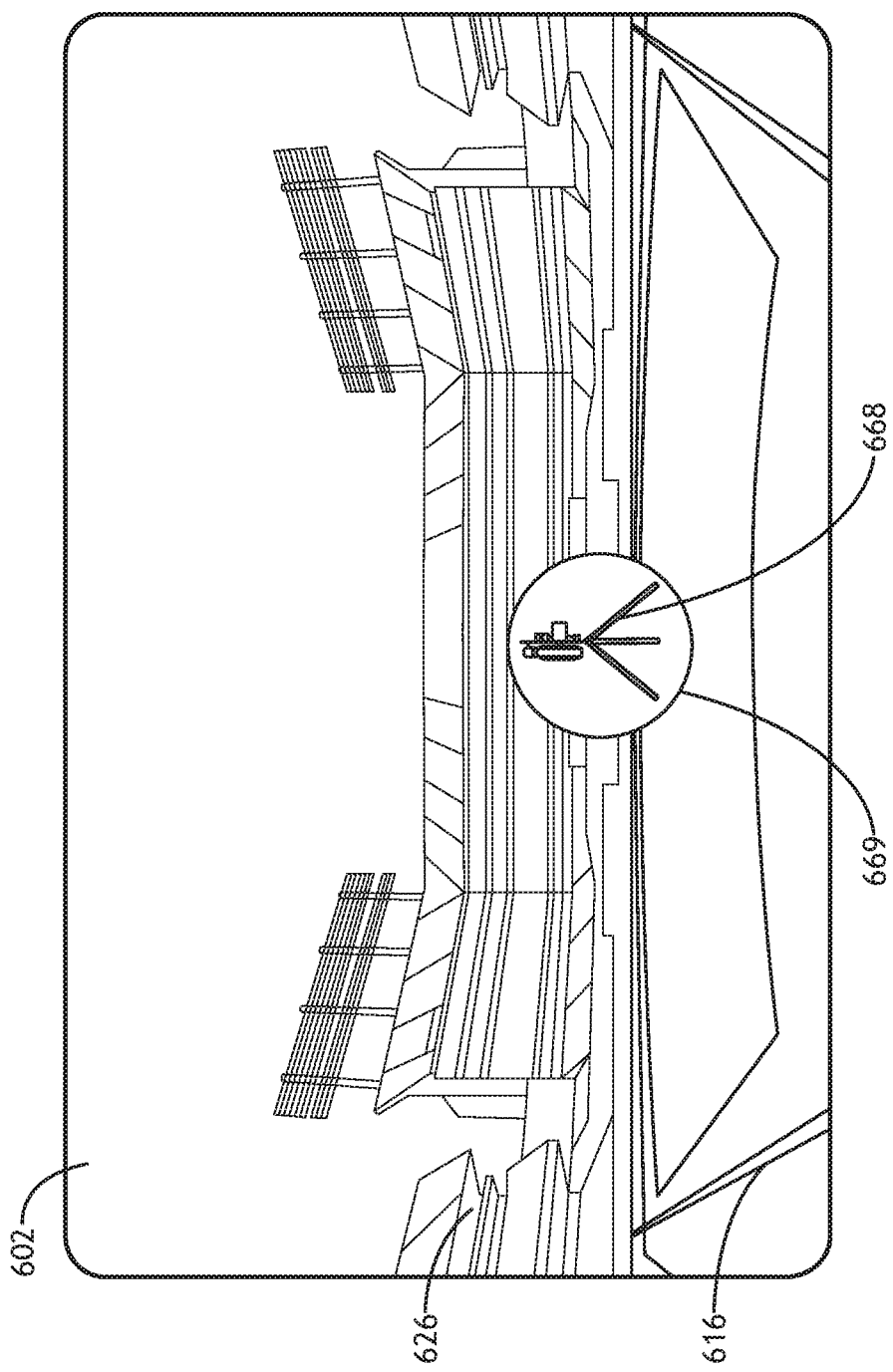

Further, the near-eye display 102 may provide smooth transitions between different views (e.g., the views of FIG. 6A and FIG. 6E) to provide a seamless experience. In this regard, the user 114 may iteratively look down at the projectile 116 and up to view the mixed-reality environment 602 including a mixed-reality combination of real or virtual objects such as, but not limited to bases 614 and field markings (e.g., base lines 616, batter's boxes 620, or the like). FIG. 6G is a conceptual view of a field of view 658 of a pitcher transitioning between a virtual environment of FIG. 6A and an unobstructed view of FIG. 6E, in accordance with one or more embodiments of the present disclosure. FIG. 6H is a conceptual view of a field of view 660 of a batter transitioning between a virtual environment of FIG. 6B and an unobstructed view of FIG. 6F, in accordance with one or more embodiments of the present disclosure.

For example, the field of view 658 may be defined by a set of view vectors associated with lines of sight of the user. The near-eye display 102 may then be configured to display virtual objects only for a first portion 662 of the field of view 658 (e.g., a first selected set of lines of sight) and an unobstructed real-world view for a second portion 664 of the field of view 658 (e.g., a second selected set of lines of sight). The transition 666 between the first portion 662 and the second portion 664 of the field of view 658 may be determined by any selected condition. For instance, as illustrated in FIG. 6C, the transition 666 may be, but is not required to be, determined based on a selected angle (e.g., a pitch angle) associated with a head orientation with respect to the horizon. Further, it is to be understood that the transition 666 may be graphically displayed using any technique known in the art such as, but not limited to, a sharp transition line, a blurred transition line, or a progression of interleaved shapes (e.g., lines as illustrated in FIGS. 6G and 6H).

In another embodiment, the mixed-reality projectile-tracking simulator 100 may provide unobstructed views for selected physical objects regardless of the head orientation of the user. For example, it may be desirable for a user preparing to hit a projectile 116 (e.g., moving towards the user) to see an unobstructed view of the source of the projectile 116 regardless of head orientation. FIG. 6I is a conceptual view of the mixed-reality environment 602 illustrated in FIGS. 6B from a field of view of a batter with an unobstructed view of a projectile source 668, in accordance with one or more embodiments of the present disclosure. The projectile source 668 may be any type of source for directing a projectile 116 towards the user such as, but not limited to, a pitching machine (as illustrated in FIG. 6I) or a person. In one embodiment, a selected set of lines of sight (e.g., a cone of reality 669) including the projectile source 668 is always visible to the user as an unobstructed real-world view. Accordingly, as the user turns his or her head, the cone of reality including lines of sight towards the projectile source 668 are free of virtual objects.

In another embodiment, the virtual environment may include one or more suggested target locations at which the user should aim. For example, FIG. 6E includes multiple target zones 670 provided to a user. For example, the target zones 670a-c may represent, but are not required to represent, desired locations at which a shot may have a relatively high predicted success rate. Further, one or more of the target zones 670 (e.g., target zones 670d-e) may represent, but are not required to represent, locations at which a shot may have a relatively low predicted success rate. In another embodiment, the suggested target zones (e.g., target zones 670a-e, or the like) may be provided to the user as goals. In this regard, the user may be guided to shoot the projectile 116 at one or more of the target zones 670 in a selected order (e.g., in an "around the clock" game, or the like). In another embodiment, the mixed-reality projectile-tracking simulator 100 may provide one or more virtual opponents 650 to react to shots by the user with a selected skill level to provide a training and simulation experience. It is to be understood that the target zones are not limited to hockey as described herein and may be extended to any sport. For example, target zones may be provided in baseball to guide and/or track pitches in various parts of the strike zone.

The user may select the virtual reality environment through any type of user interface. For example, the near-eye display 102 may provide a series of menus and display choices to the user 114. Further, the user 114 may interact with the near-eye display 102 with the user interface 228. In one embodiment, as described previously herein, the near-eye display 102 may include an eye-tracking system. In the regard, the user may scroll through various configuration menus using eye movements and may make selections using eye gestures such as, but not limited to, one or more short blinks, one or more long blinks, or eye rolls. In another embodiment, the near-eye display 102 may include one or more buttons or sliders to facilitate user input. For instance, a user may select a location within the virtual environment (e.g., a location on a virtual field) by simply sliding a finger along a slider device.

In another embodiment, the method 500 includes a step 508 of receiving tracking data of the projectile 116 over a launch window after a launch. For example, the controller 108 may receive tracking data of the projectile 116 from the projectile-tracking sub-system 104.

In another embodiment, the method 500 includes a step 510 of displaying a virtual object representing the projectile 116 (e.g., a virtual projectile 674) along a predicted trajectory 676 within the mixed-reality environment. For example, FIG. 6A illustrates a pitch with a virtual projectile 674 moving along a predicted trajectory 676 showing a strike. By way of another example, FIG. 6B illustrates a with a virtual projectile 674 moving along a predicted trajectory 676 showing a low hit towards right field. By way of another example, FIG. 6E illustrates a virtual projectile 674 moving along a predicted trajectory 676 showing a successful hockey shot. FIG. 6E illustrates a virtual projectile 674 moving along a predicted trajectory 676 showing a successful tennis shot.

The predicted trajectory 676 may be displayed in any user-selectable manner. For example, the entire predicted trajectory 676 may be displayed as illustrated in FIG. 6A. By way of another example, a portion of the predicted trajectory 676 may be displayed as a "tail" of a selected length behind the virtual projectile 674. Further, suggested trajectories may be provided as guides for the user.

The predicted trajectory may be calculated by any technique known in the art. For example, the predicted trajectory may be calculated by the controller 108 based on data from the projectile-tracking sub-system 104 and/or the user-tracking sub-system 106 generated during the launch window as described previously herein. For instance, the controller 108 may determine a partial trajectory of the projectile 116 over the launch window and utilize this partial trajectory along with the additional ball data at the end of the launch window such as, but not limited to velocity and rotation to determine the predicted trajectory.

In another embodiment, the controller 108 determines the predicted trajectory based on weather conditions such as, but not limited to, wind speed, air pressure, or temperature. For example, weather conditions may correspond to real-world weather conditions at the current location of the user 114. In one instance, weather conditions may be gathered by one or more weather sensors integrated within the mixed-reality projectile-tracking simulator 100 (e.g., within the near-eye display 102, the projectile-tracking sub-system 104, the user-tracking sub-system 106, or as stand-alone sensors). In another instance, weather conditions are received from a remote server (e.g., a weather website, or the like). By way of another example, weather conditions may be selected by the user 114 to provide for simulation and/or training in a selected environment. Similarly, the weather conditions may be manually selected (e.g., via the user interface 228) or may be received from a remote server providing weather data for a selected remote location (e.g., a field at which an upcoming game is to be played).

In another embodiment, the method 500 includes a step 512 of displaying user-selected projectile-trajectory data as virtual objects. As described previously herein, the mixed-reality projectile-tracking simulator 100 may monitor and track a wide range of metrics associated with sporting actions (e.g., throwing or hitting) and present associated projectile-tracking data to the user for feedback. For example, as illustrated in FIGS. 6A and 6D, the near-eye display 102 may display projectile-tracking data 678 as virtual objects to the user. By way of another example, as illustrated in FIG., the near-eye display 102 may display a success indicator 680 showing whether a launch was successful by any selected metric (e.g., whether a goal was made, whether throw had a selected velocity and/or trajectory, whether a hit landed in a selected field position, or the like. By way of another example, the near-eye display 102 may display historical data 682 associated with previous user actions such as, but not limited to, a number of successful attempts (e.g., of a given type, from a given location, or the like) or statistical analyses of the projectile-tracking data 678 (e.g., average values, best values, worst values, or the like). For example, a historical maximum value of a given datapoint may be represented as a full circle and a current value may be represented as a partially-filled circle based on the percentage of the maximum value.

In one instance the near-eye display 102 may display the projectile-tracking data 678 as head-locked data that remains in a fixed position regardless of the orientation of the user 114. In another instance, the near-eye display 102 may display the projectile-tracking data 678 as spatially anchored data at a fixed location within the virtual environment. For instance, though not shown, projectile-tracking data may be presented on a virtual board located on or near the field such that the data may be visible when the user looks in the direction of the virtual board.

Further, as described previously herein, the near-eye display 102 may display the projectile-tracking data 678 only at selected times (e.g., after a launch) or selected orientations (e.g., for view vectors above a selected angle, or the like).

In another embodiment, the mixed-reality projectile-tracking simulator 100 supports multiple user modes. For example, a user mode may include predefined settings configured to provide a selected user experience. Further, the user modes may be generated, modified, and/or saved by the user 114.

Figure 7:
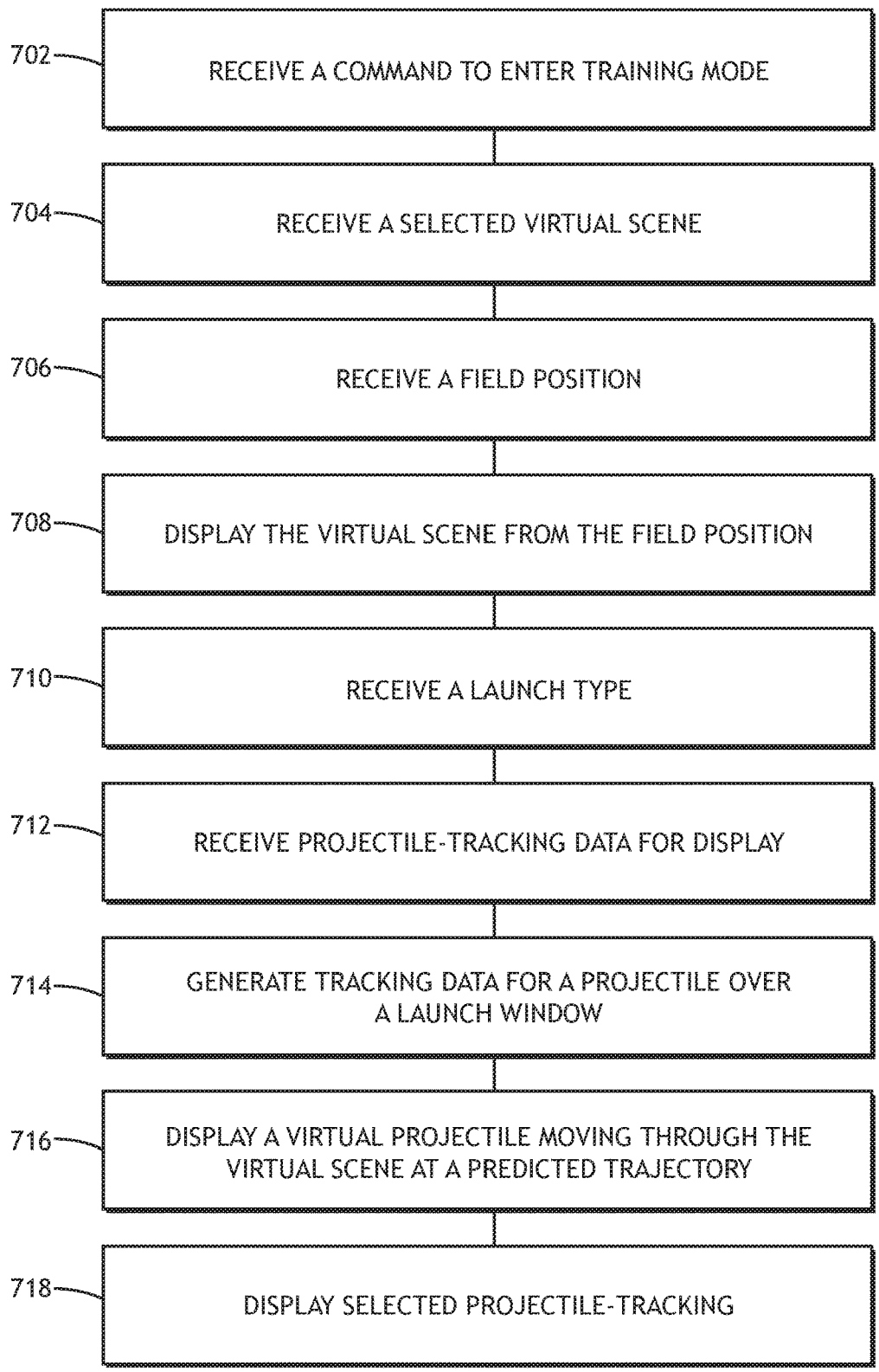
FIG. 7 is a flow diagram illustrating steps performed in a training mode, in accordance with one or more embodiments of the present disclosure.

FIG. 7 is a flow diagram illustrating steps performed in a training mode 700, in accordance with one or more embodiments of the present disclosure. Applicant notes that the embodiments and enabling technologies described previously herein in the context of the mixed-reality projectile-tracking simulator 100 should be interpreted to extend to training mode 700. It is further noted, however, that the training mode 700 is not limited to the architecture of the mixed-reality projectile-tracking simulator 100.

In one embodiment, a training mode provides a data-driven experience in which the user may be provided projectile-tracking data. In this regard, the user may utilize the projectile-tracking data to monitor, track, and/or analyze his or her technique. For example, the training mode may be utilized by a user on a practice field to view projectile-tracking data and/or coaching feedback after performing actions. By way of another example, the training mode may be utilized by a user to include one or more mixed-reality objects (e.g., virtual objects associated with a desired field, audio feedback, or the like). In this regard, a user may train in any selected environment.

In one embodiment, the training mode 700 includes a step 702 of receiving a command to enter the training mode. For example, the user may utilize the user interface 228 of the near-eye display 102 to enter the training mode. In another embodiment, the training mode 700 includes a step 704 of receiving a selected virtual scene. For example, the training mode include a pre-configured default virtual environment that may be further adjusted based on user preferences. In one instance, the virtual environment includes a combination of physical and virtual objects associated with field markings, goals, nets, portions of a stadium, or the like. In another instance, the virtual environment includes environmental conditions such as, but not limited to, the time of day and the weather (temperature, pressure, wind speed, precipitation or the like). The environmental conditions may be automatically imported based on current conditions as monitored by sensors as described previously herein or may be adjusted by the user to provide a desired simulation environment. In another instance, the training mode 700 may provide a selected level of crowd noise via the near-eye display 102. In another embodiment, the training mode 700 includes a step 706 of receiving a selected field position. In another embodiment, the training mode 700 includes a step 708 of displaying the virtual scene from the selected field position.

In another embodiment, the training mode 700 includes a step 710 of receiving a launch type. For example, a user may select launch types based on a selected sport such as, but not limited to, a pitch in baseball or softball, a serve in tennis, a shot in hockey, a throw of a track and field projectile (e.g., a javelin, a discus, a shotput, or the like), batting a selected pitch in baseball or softball, or responding to a selected shot in tennis. By way of another example, the mixed-reality projectile-tracking simulator 100 may identify a launch type after a launch. For example, the mixed-reality projectile-tracking simulator 100 may identify a type of pitch thrown. The mixed-reality projectile-tracking simulator 100 may identify a launch type based on any combination of factors such as, but not limited to, a selected virtual environment, a field position, projectile-tracking data, user-tracking data, or a predicted trajectory.

In another embodiment, the training mode 700 includes a step 712 of receiving selected projectile-tracking data for display. For example, the training mode may provide a default set of relevant projectile-tracking data for each launch type that may be further customizable by the user as well as general data relevant to all launch types. For instance, the training mode may provide projectile-tracking data such as, but not limited to, launch velocity, launch angle, arc height, rotation, hook data, or distance for all launch types. Further, the training mode 700 may provide data indicative of whether a particular attempt was successful (e.g., a goal was made, a pitch was a strike, a projectile was hit a certain distance, a projectile was hit to an intended field position, or the like.

In another embodiment, the training mode 700 includes a step 714 of generating tracking data for a projectile over a launch window. In another embodiment, the training mode 700 includes a step 716 of displaying a virtual projectile (e.g., virtual projectile 674) moving through the virtual scene along a predicted trajectory (e.g., predicted trajectory 676. In another embodiment, the training mode 700 includes a step 718 of displaying the selected projectile-tracking data based on the tracking data over the launch window.

In another embodiment, the training mode 700 may display virtual objects providing user guided coaching. For example, the near-eye display 102 may provide audio and/or visual coaching suggestions to a user on various techniques, suggest body positions, suggested body movements, or the like. For instance, the coaching suggestions may include an opaque virtual object including images and/or video illustrating suggested techniques. In another instance, the coaching suggestions may include semi-transparent guides for suggested user movements during a launch such as, but not limited to, an arm trajectory, a suggested point of impact on the projectile 116, or the like. As described previously herein, the coaching suggestions may be pre-recorded and/or may be data driven based on data from the projectile-tracking sub-system 104 and/or the user-tracking sub-system 106.

Figure 8:
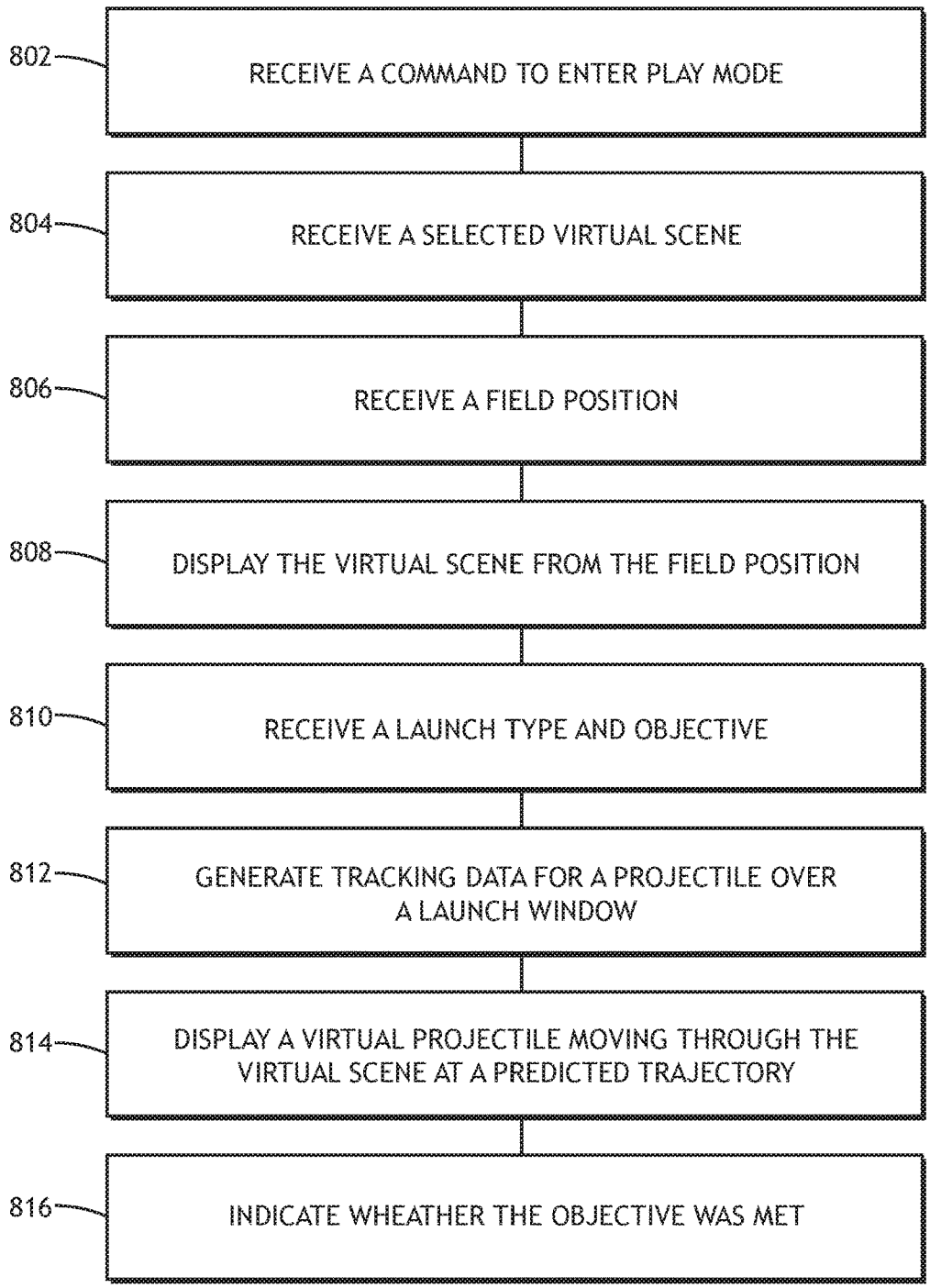
FIG. 8 is a flow diagram illustrating steps performed in a play mode, in accordance with one or more embodiments of the present disclosure.

FIG. 8 is a flow diagram illustrating steps performed in a play mode 800, in accordance with one or more embodiments of the present disclosure. Applicant notes that the embodiments and enabling technologies described previously herein in the context of the mixed-reality projectile-tracking simulator 100 should be interpreted to extend to play mode 800. It is further noted, however, that the play mode 800 is not limited to the architecture of the mixed-reality projectile-tracking simulator 100.

In one embodiment, a play mode may provide a user with a simulated play experience. For example, the play mode may include, but is not required to include, launch objectives such as, but not limited to, making a goal from a selected field position, achieving a hit with a selected distance, or executing a pitch to a targeted area of the strike zone. Accordingly, in a play mode, a user may emphasize, but is not required to emphasize, the outcome of a launch over projectile-tracking data. For example, a user 114 may utilize a play mode to train for an upcoming game at a selected field by generating a mixed-reality environment including, but not limited to, visual depictions of the stadium as well as simulated crowd noise. In this regard, the user 114 may practice (on any practice field) multiple types of sport actions (e.g., launches) at multiple locations within the simulated virtual environment. Accordingly, the user 114 may feel mentally and physically prepared on the game day.

Further, a play mode may be suitable for multiplayer use in which different users may compete on the same tasks. For example, as illustrated in FIG. 4, the near-eye display 102 may display one or more avatars 402 to the user 114 within the virtual scene such that the user 114 may visualize the actions of the avatars 402 as well as interact with the avatars 402. The avatars 402 may be associated with any combination of system-generated players and additional users of the mixed-reality projectile-tracking simulator 100 or a communicatively-coupled mixed-reality projectile-tracking simulator 100. Further, the avatars 402 may represent either teammates or opponents in a game-like simulation.

In one embodiment, the play mode 800 includes a step 802 of receiving a command to enter the training mode. For example, the user may utilize the user interface 228 of the near-eye display 102 to enter the play mode 800. In another embodiment, the play mode 800 includes a step 804 of receiving a selected virtual scene. For example, the play mode 800 may provide a selection of available virtual scenes representing fields or stadiums in which to play. In one instance, the virtual environment includes a combination of physical and virtual objects associated with field markings, goals, nets, portions of a stadium, or the like. In another instance, the virtual environment includes environment conditions such as, but not limited to, the time of day and the weather (temperature, pressure, wind speed, precipitation or the like). The environmental conditions may be automatically imported based on current conditions as monitored by sensors (e.g., within the near-eye display 102 and/or the projectile-tracking sub-system 104) or may be adjusted by the user to provide a desired simulation. In another instance, the play mode 800 may provide a selected level of crowd noise via the near-eye display 102. In another embodiment, the play mode 800 includes a step 806 of receiving a selected field position. The selected field position may be provided by the user via the user interface 228. In another embodiment, the play mode 800 includes a step 808 of displaying the virtual scene from the selected field position.

In another embodiment, the play mode 800 includes a step 810 of receiving a launch type and objective. For example, a user may select launch types such as, but not limited to, a pitch in baseball or softball, a serve in tennis, a shot in hockey, a throw of a track and field projectile (e.g., a javelin, a discus, a shotput, or the like), batting a selected pitch in baseball or softball, or responding to a selected shot in tennis. Further, a user may selected one or more desired objectives (e.g., outcomes or characteristics) associated with the launch such as, but not limited to, making a goal, perform a pitch with a selected speed or trajectory (e.g., a breaking ball, or the like), serving a tennis ball to a selected spot on the field, throwing a certain distance, hitting a home run, or the like. By way of another example, the mixed-reality projectile-tracking simulator 100 may detect the launch type and/or the objective. For instance, the mixed-reality projectile-tracking simulator 100 may identify a launch type and/or objective based on any combination of factors such as, but not limited to, a selected virtual environment, a field position, projectile-tracking data, user-tracking data, or a predicted trajectory.

In another embodiment, the play mode 800 includes a step 812 of generating projectile-tracking data for a projectile over a launch window. In another embodiment, the play mode 800 includes a step 814 of displaying the selected projectile-tracking data based on the tracking data over the launch window.

In another embodiment, the play mode 800 includes a step 816 of indicating whether the objective was met. For example, the near-eye display 102 may include a virtual indicator 818 to indicate to the user whether the selected launch objective was met (e.g., see projectile-tracking data in FIGS. 6E and 6F).

In one embodiment, the near-eye display 102 displays only an indication of whether the objective was met. In another embodiment, the near-eye display 102 displays additional projectile-tracking data relevant to the desired objective such as, but not limited to, the travel distance or the launch speed to provide an indication of how close the attempt was.

It is noted herein that the above descriptions of the training mode 700 and the play mode 800 are provided solely for illustrative purposes and should not be interpreted as limiting. For example, the mixed-reality projectile-tracking simulator 100 may support any number of user-defined or system-defined modes in which any aspect of a virtual environment may be tuned to provide a selected mixed-reality experience.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A mixed-reality sport simulation system comprising:
    a projectile-tracking sub-system configured to generate projectile-tracking data when a projectile is launched by a user;
    a near-eye display configured to display mixed-reality virtual objects displayed over physical objects within a field of view of a user, wherein the near-eye display includes one or more sensors to determine the field of view, wherein the field of view defines view vectors representing lines of sight of the user; and
    a controller communicatively coupled to the projectile-tracking sub-system and the near-eye display, the controller including one or more processors configured to execute program instructions causing the one or more processors to:
        direct the near-eye display to display a mixed-reality environment including virtual objects within at least a portion of the user field of view, wherein the near-eye display provides an unobstructed real-world view for view vectors below a selected pitch angle and display at least a portion of the mixed-reality environment for view vectors above a selected pitch angle;
        receive projectile-tracking data of a projectile launched by the user in real-time from the projectile-tracking sub-system; and
        direct the near-eye display to display one or more virtual objects representing a trajectory of the projectile within the mixed-reality environment in real-time, wherein the trajectory of the projectile is based on the projectile-tracking data.

2. The mixed-reality sport simulation system of claim 1, wherein the projectile-tracking data generated when the projectile is launched by a user comprises:
    projectile-tracking data generated when the projectile is at least one of thrown by the user or hit by the user.

3. The mixed-reality sport simulation system of claim 1, wherein the projectile comprises:
    at least one of a ball, a puck, a discus, a javelin, or a hammer.

4. The mixed-reality sport simulation system of claim 1, wherein the launch window ends when motion of the projectile is hindered by a containment device, wherein the containment device comprises:
    at least one of a net or a tether.

5. The mixed-reality sport simulation system of claim 1, wherein the mixed-reality environment includes a virtual object displayed over a portion of the field of view, wherein at least a portion of the field of view is unobstructed to provide visualization of physical objects through the near-eye display, wherein a displayed perspective of the virtual object is continually updated based on a location of the user within the mixed-reality environment.

6. The mixed-reality sport simulation system of claim 1, wherein the mixed-reality environment includes a virtual reality scene obstructing at least a portion of the field of view.

7. The mixed-reality sport simulation system of claim 1, wherein the near-eye display is configured to display an unobstructed real-world view when the near-eye display determines that a gaze direction of the user is directed at the projectile prior to the user launching the projectile, wherein the near-eye display is further configured to transition to a display of the mixed-reality environment when the near-eye determines that a gaze direction of the user is directed above a selected angle.

8. The mixed-reality sport simulation system of claim 7, wherein the near-eye display is configured to fade transparency values of the one or more virtual objects of the mixed-reality environment based on the gaze direction of the user.

9. The mixed-reality sport simulation system of claim 1, wherein the selected projectile-tracking data comprises:
    a persistent trail indicative of at least a portion of the predicted trajectory.

10. The mixed-reality sport simulation system of claim 1, wherein the one or more processors are further configured to execute program instructions causing the one or more processors to:
    direct the near-eye display to display one or more virtual objects representing selected projectile-tracking data.

11. The mixed-reality sport simulation system of claim 1, wherein the near-eye display includes a user input device, wherein the mixed-reality environment and the data display objects are selectable as preset modes via the user input device, wherein the preset modes include a training mode, wherein the training mode includes preset configurations of the mixed-reality environment, wherein the one or more processors are further configured to execute program instructions causing the one or more processors to:
    receive a command to enter the training mode via the user input device;
    receive a user location within the mixed-reality environment via the user input device; and
    direct the near-eye display to display one or more virtual objects representing selected projectile-tracking data.

12. The mixed-reality sport simulation system of claim 1, wherein the near-eye display includes a user input device, wherein the mixed-reality environment and the data display objects are selectable as preset modes via the user input device, wherein the preset modes include a play mode, wherein the play mode includes a set of user-selectable mixed-reality environments, wherein the one or more processors are further configured to execute program instructions causing the one or more processors to:
    receive a command to enter the play mode via the user input device;
    receive a user location within the mixed-reality environment via the user input device;
    receive a launch type;
    determine a trajectory objective based on the launch type; and
    direct the near-eye display to display a virtual indicator of whether the trajectory objective was met based on at least one of the data from the projectile-tracking sub-system or the predicted trajectory.

13. The mixed-reality sport simulation system of claim 1, wherein the virtual reality scene comprises:
   an avatar associated with a remote user.

14. The mixed-reality sport simulation system of claim 1, further comprising:
   a user-tracking sub-system including one or more sensors to generate user-motion data indicative of motion of the user during a launch.

15. The mixed-reality sport simulation system of claim 14, wherein the one or more processors are further configured to execute program instructions causing the one or more processors to:
   direct the near-eye display to display a virtual object including an avatar representing the user, wherein the avatar replicates motion of the user based on the user-motion data.

16. The mixed-reality sport simulation system of claim 1, wherein the near-eye display is integrated within a helmet.

17. A mixed-reality sport simulation system comprising:
   a projectile-tracking sub-system configured to generate projectile-tracking data over a selected portion of a trajectory of a projectile launched by a user;
   a near-eye display configured to display a mixed-reality scene including virtual objects displayed over physical objects within a field of view of the user, wherein the near-eye display includes one or more sensors to determine a head orientation of the user; and
   a controller communicatively coupled to the projectile-tracking sub-system and the near-eye display, the controller including one or more processors configured to execute program instructions causing the one or more processors to:
      identify a projectile source for directing a projectile toward the user;
      direct the near-eye display to provide an unobstructed real-world view of the projectile source regardless of the head orientation of the user;
      receive projectile-tracking data of a projectile from the projectile source after the projectile is launched by the user; and
      direct the near-eye display to display one or more virtual objects indicative of at least a portion of the projectile-tracking data.

18. A mixed-reality sport simulation system comprising:
   a projectile-tracking sub-system configured to generate projectile-tracking data of a projectile over a launch window when the projectile is launched by a user;
   a near-eye display configured to display mixed-reality virtual objects displayed over physical objects within a field of view of the user, wherein the near-eye display includes a user input device; and
   a controller communicatively coupled to the projectile-tracking sub-system and the near-eye display, the controller including one or more processors configured to execute program instructions causing the one or more processors to:
      direct the near-eye display to display a mixed-reality environment including virtual objects depicting one or more elements of an athletic field within at least a portion of the user field of view, wherein a location of the user within the mixed-reality environment is selectable via the user input device;
      receive projectile-tracking data of a projectile over the launch window in real-time from the projectile-tracking sub-system as the user launches the projectile; and
      direct the near-eye display to display a virtual object representing the projectile moving along a predicted trajectory after the launch window within the mixed-reality environment, wherein the predicted trajectory is determined based on the projectile-tracking data over the launch window.

* * * * *